United States Patent
Shanbhogue et al.

(10) Patent No.: US 12,032,485 B2
(45) Date of Patent: Jul. 9, 2024

(54) 64-BIT VIRTUAL ADDRESSES HAVING METADATA BIT(S) AND CANONICALITY CHECK THAT DOES NOT FAIL DUE TO NON-CANONICAL VALUES OF METADATA BIT(S)

(71) Applicant: Intel Corporation, Santa Clara, CA (US)

(72) Inventors: Vedvyas Shanbhogue, Austin, TX (US); Gilbert Neiger, Portland, OR (US); Stephen Robinson, Austin, TX (US); Dan Baum, Haifa (IL); Ron Gabor, Haifa (IL)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 17/133,570

(22) Filed: Dec. 23, 2020

(65) Prior Publication Data
US 2022/0197822 A1    Jun. 23, 2022

(51) Int. Cl.
*G06F 12/10* (2016.01)
*G06F 11/07* (2006.01)
*G06F 12/1027* (2016.01)

(52) U.S. Cl.
CPC ........ *G06F 12/1027* (2013.01); *G06F 11/073* (2013.01); *G06F 2212/657* (2013.01); *G06F 2212/683* (2013.01)

(58) Field of Classification Search
CPC ............... G06F 12/1027; G06F 11/073; G06F 2212/657; G06F 2212/683
See application file for complete search history.

(56) References Cited

U.S. PATENT DOCUMENTS 6,807,616 B1   10/2004   McGrath et al.
6,898,697 B1   5/2005    Gao et al.
(Continued)

FOREIGN PATENT DOCUMENTS

EP    3588360 A1    1/2020

OTHER PUBLICATIONS

European Search Report and Search Opinion, EP App. No. 21197309.4, dated Apr. 4, 2022, 8 pages.
(Continued)

*Primary Examiner* — Jae U Yu
(74) *Attorney, Agent, or Firm* — Nicholson De Vos Webster & Elliott LLP

(57) ABSTRACT

Techniques to allow use of metadata in unused bits of virtual addresses are described. A processor of an aspect includes a decode circuit to decode a memory access instruction. The instruction to indicate one or more memory address operands that are to have address generation information and metadata. An execution circuit coupled with the decode circuit to generate a 64-bit virtual address based on the one or more memory address operands. The 64-bit virtual address having a bit 63, an X-bit address field starting at a bit 0 to store an address generated from the address generation information, and one or more metadata bits to store the metadata. The execution circuit also to perform a canonicality check on the 64-bit virtual address that does not fail due to non-canonical values of the metadata stored in the one or more metadata bits. Other processors, methods, systems, and instructions are disclosed.

51 Claims, 17 Drawing Sheets

(56) References Cited

U.S. PATENT DOCUMENTS

| | | | |
|---|---|---|---|
| 7,761,674 | B2 | 7/2010 | Durham et al. |
| 9,286,245 | B2 | 3/2016 | Durham et al. |
| 9,619,313 | B2 | 4/2017 | Gabor et al. |
| 9,652,375 | B2 | 5/2017 | Gabor et al. |
| 9,858,140 | B2 | 1/2018 | Sade et al. |
| 10,073,727 | B2 | 9/2018 | Stark et al. |
| 10,095,573 | B2 | 10/2018 | Stark et al. |
| 11,029,957 | B1 | 6/2021 | Sahita et al. |
| 2003/0033507 | A1 | 2/2003 | McGrath |
| 2012/0246437 | A1 | 9/2012 | Radovic et al. |
| 2013/0036332 | A1 | 2/2013 | Gove et al. |
| 2014/0115283 | A1 | 4/2014 | Gove et al. |
| 2017/0177429 | A1 | 6/2017 | Stark et al. |
| 2017/0249261 | A1* | 8/2017 | Durham .............. G06F 12/1009 |
| 2018/0004595 | A1 | 1/2018 | Raj et al. |
| 2018/0004655 | A1 | 1/2018 | Wilkinson et al. |
| 2019/0042799 | A1 | 2/2019 | Durham et al. |
| 2019/0108130 | A1 | 4/2019 | Durham et al. |
| 2019/0227951 | A1 | 7/2019 | Durham et al. |
| 2020/0125770 | A1 | 4/2020 | Lemay et al. |
| 2020/0409847 | A1 | 12/2020 | Gabor et al. |
| 2020/0409868 | A1 | 12/2020 | Durham |
| 2021/0117535 | A1 | 4/2021 | Lemay et al. |
| 2021/0200686 | A1 | 7/2021 | Gabor et al. |
| 2021/0200687 | A1 | 7/2021 | Durham et al. |

OTHER PUBLICATIONS

Intention to Grant, EP App. No. 21197309.4, dated Mar. 17, 2023, 5 pages.
Intention to Grant, EP App. No. 21197309.4, dated Aug. 4, 2023, 9 pages.
Apparatus and Method for Efficient Process-Based Compartmentalization, U.S. Appl. No. 16/728,928.
Apparatuses, Methods, and Systems for Instructions to Compartmentalize Code, U.S. Appl. No. 16/833,478.
Hardware Apparatuses, Methods, and Systems for Individually Revocable Capabilities for Enforcing Temporal Memory Safety, U.S. Appl. No. 16/729,358.
Memory Tagging Apparatus and Method, U.S. Appl. No. 16/728,527.
Memory Tagging Metadata Manipulation, U.S. Appl. No. 16/729,371.
ARM, "ARM(registered) Cortex(registered)-A Series", Version: 1.0, Programmer's Guide for ARMv8-A, 2015, 296 pages.
ARM, "Armv8-A Address Translation", Version 1.1, 2017-2019, pp. 1-32.
ARM, "Memory Management", Version 1.0, 2019, 26 pages.
Motorola, "Chapter 4: Address Generation Unit", DSP56300 Family Manual, AGU Architecture, 2005, 14 pages.
Extended European Search Report, EP App. No. 23215435.1, Mar. 25, 2024, 12 pages.

* cited by examiner

64-BIT VIRTUAL ADDRESSES HAVING METADATA BIT(S) AND CANONICALITY CHECK THAT DOES NOT FAIL DUE TO NON-CANONICAL VALUES OF METADATA BIT(S)

BACKGROUND

Technical Field

Embodiments described herein generally relate to data processing. In particular, embodiments described herein generally relate to memory addressing in processors.

Background Information

Virtual memory is a commonly employed memory management technique that provides an abstraction of the actual physical storage locations available on a computer and is typically used to create the illusion that there are more actual physical storage locations than is actually available. When virtual memory is used, software uses virtual addresses to access data in memory. These virtual addresses contain addresses or values that point to or indicate the virtualized location of the data. These virtual addresses are sometimes referred to as pointers or in some instruction set architectures (e.g., x86) as linear addresses and broadly represent logical addresses rather than the actual physical addresses of the data. Address translation is used to translate or convert these virtual addresses to the physical addresses that point to the actual physical storage locations where the data is stored.

BRIEF DESCRIPTION OF THE DRAWINGS

The invention may best be understood by referring to the following description and accompanying drawings that are used to illustrate embodiments. In the drawings.

DETAILED DESCRIPTION OF EMBODIMENTS

The present disclosure relates to methods, apparatus, systems, and non-transitory computer-readable storage media for allowing 64-bit virtual addresses to have one or more metadata bits and to performing canonicality checks that do not fail due to non-canonical values of the one or more metadata bits. In the following description, numerous specific details are set forth (e.g., specific virtual addresses, fields, processor configurations, microarchitectural details, sequences of operations, etc.). However, embodiments may be practiced without these specific details. In other instances, well-known circuits, structures, and techniques have not been shown in detail to avoid obscuring the understanding of the description.

Figure 1:
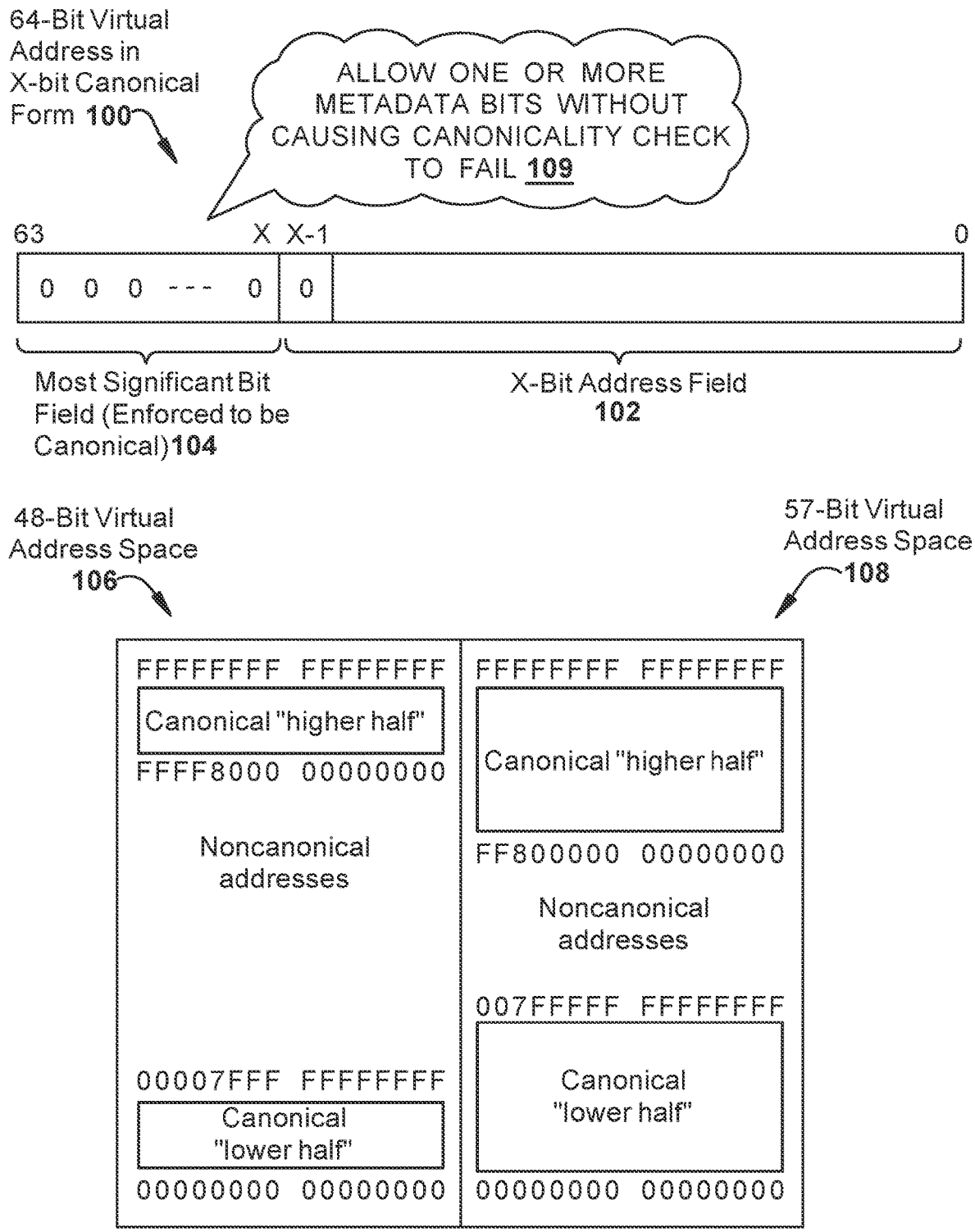
FIG. 1 is a block diagram of a 64-bit virtual address in X-bit canonical form, an example 48-bit address space, and an example 57-bit address space.

FIG. 1 is a block diagram of a 64-bit virtual address 100 in X-bit canonical form, an example 48-bit address space 106, and an example 57-bit address space 108. The virtual address has a length of 64-bits in which bit 0 is the least significant or lowest order bit and bit 63 is the most significant or highest order bit. The 64-bit virtual address has an X-bit address field 102 in bits [X−1:0] that can store an X-bit virtual address. The 64-bit virtual address also has a most significant (64−X)-bit field in bits [63:X]. This field includes bits beyond the X-bits used for addressing. Historically, some implementations have not used all 64-bits of the virtual address. 64-bits can address a vast address space, and in some implementations such a vast address space is not needed. Rather, as shown here, only a subset of the least significant X-bit address field has been used to store address bits to address a smaller address space, but the most significant (64−X)-bit field has not been used to store address bits. By way of example, in certain processors available from Intel Corporation, of Santa Clara California, U.S.A., only either 48-bits or 57-bits have been used for the X-bit address field. One reason for this is that some implementations have not needed and/or do not need to use the entire quite large virtual address space that is addressable by all 64-bits.

Rather, the most significant (64−X)-bit field has been used to store canonical bits to make the 64-bit virtual address canonical (e.g., in canonical form or a canonical address). The 64-bit virtual address is canonical if address bits 63 through to the most-significant implemented address bit used by the microarchitecture (e.g., in this example bit (X−1)) are identical, namely either all set to binary one, or all cleared to binary zero. By way of example, when the X-bit address field is 48-bits, then bits 63 through 48 must either all be set to binary one when bit 47 is set to binary one, or all be cleared to binary zero when bit 47 is cleared to binary zero, in order for the 64-bit virtual address to be 48-bit canonical. Similarly, when the X-bit address field is 57-bits, then bits 63 through 57 must either all be set to binary one when bit 56 is set to binary one, or all be cleared to binary zero when bit 56 is cleared to binary zero, in order for the 64-bit virtual address to be 57-bit canonical. Virtual addresses that are 48-bit canonical are also 57-bit canonical.

The 64-bit virtual address in canonical form basically apportion the total 64-bit address space into two halves, namely a canonical "lower half" that starts at 00000000 00000000 that grows upwards, and a canonical "higher half" that starts at FFFFFFFF FFFFFFFF (the top of the address space) and grows downwards. The 48-bit virtual address space 106 is mapped to canonical form addresses from 0 through 00007FFF FFFFFFFF, and from FFFF8000 00000000 through FFFFFFFF FFFFFFFF, for a total of 256 tebibyte (TiB) of usable virtual address space. The 57-bit virtual address space 108 is mapped to canonical form addresses from 0 through 007FFFFF FFFFFFFF, and from FF800000 00000000 through FFFFFFFF FFFFFFFF, for even more usable virtual address space. In some architectures like x86, the canonical "lower half" is used by unprivileged user-level software, whereas the canonical "higher half" is used by supervisory-level or privileged-level software. Between the canonical "lower half" and the canonical "higher half" of each address space are noncanonical addresses. The noncanonical addresses are those where any one or more of bits 63 through 48 do not match bit 47 for 48-bit addressing, or where any one or more of bits 63 through 57 do not match bit 56 for 57-bit addressing.

Conventionally, canonicality of 64-bit virtual addresses has been enforced in hardware of processors. For example, the processors may have hardware or circuitry to check to ensure that the 64-bit virtual address is canonical, namely that address bits 63 through to the most-significant implemented address bit used by the microarchitecture (e.g., in this example bit (X−1)) are identical. This is often referred to in the art as a canonicality check. If the 64-bit virtual address is not canonical, then the processor may raise or otherwise cause some sort of an error (e.g., a general-protection exception (#GP), a canonical fault, a stack fault (#SS) for stack references, other fault or exception, or other type of noncanonicality error).

One reason for performing such canonicality checks was to prevent software from using any of the bits [63:X] to store metadata rather than purely canonical valued bits. Software has long wanted to use bits within the 64-bit virtual addresses themselves to store metadata. Metadata broadly represents data that describes other data. The metadata may be used by software in various different ways, and for various different purposes, and the scope of the invention is not limited to any such known way or purpose. By way of example, in some cases the metadata may include one or more bits to flag, tag, or mark the virtual address or the data it points to for some software defined purpose, such as security, garbage collection implementation, or other purposes. As one specific example, a plurality of metadata bits may represent a tag or color that is compared to a tag or color associated with the data being accessed in a lock and key type of security access control.

Conventionally, the processor allowing storage of metadata in the bits [63:X] would have prevented or at least made it more challenging for address expansion (e.g., to expand the X-bit address field to more than X address bits) to address more virtual memory, such as when expanding from 48-bit addressing to 57-bit addressing. Due to such canonicality checks, software has resorted to various techniques to allow it to include metadata in these most significant non-address bits. However, these techniques are often complex and/or have a high overhead implementation cost. Other approaches would be beneficial.

Referring again to FIG. 1, some embodiments, as shown at 109, may allow one or more metadata bits to be included as one or more of bit 63 through the most-significant implemented address bit used by the microarchitecture (e.g., in this example bit (X−1)). In some embodiments, these one or more metadata bits may be included without causing a canonicality check to fail even when one or more of them have a noncanonical value. Advantageously, the approaches described herein help to allow software to included metadata in the 64-bit virtual address itself while avoiding the often complex and/or high overhead associated with software needing to prevent the canonicality checks from failing due to the metadata bits.

Figure 2A:
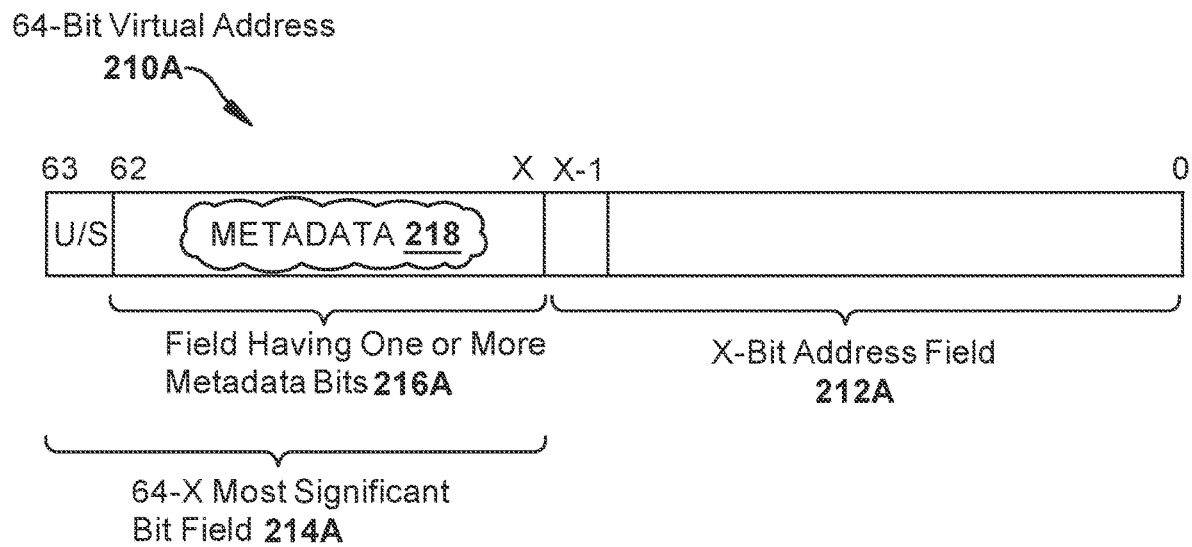
FIG. 2A is a block diagram of a first embodiment of a 64-bit virtual address.

FIG. 2A is a block diagram of a first embodiment of a 64-bit virtual address 210A. The virtual address has a length of 64-bits in which bit 0 is the least significant or lowest order bit and bit 63 is the most significant or highest order bit. The 64-bit virtual address has an X-bit address field 212A in bits [X−1:0] that can store an X-bit virtual address. In some embodiments, the X-bit address field may be 48-bits or 57-bits, although this is not required. The X-bit virtual address may be used (e.g., translated during address translation) to determine a physical memory address.

The 64-bit virtual address also has a most significant (64−X)-bit field 214A in bits [63:X]. In some embodiments, bit 63 may store a user-level or supervisor-level (U/S) indicator bit that may be cleared to binary zero to indicate the 64-bit virtual address is user-level or set to binary one to indicate the 64-bit virtual address is supervisor-level.

Between bit 63 and bit (X−1) is a field [62:X] 216A having one or more metadata bits that may each be used to store a bit of metadata 218. In various embodiments, there may be 1, 2, 3, 4, 5, 6, 7, 8, 9, 10, 11, 12, 13, 14, 15, or more metadata bits. In some embodiments, the entire field of bits [62:X] may be available as metadata bits and software may choose if and how to use any one or more of the field of bits [62:X] to store metadata.

The metadata may be used by software in various different ways, and for various different purposes, and the scope of the invention is not limited to any such known way or purpose. Examples of possible uses of the metadata include, but are not limited to, using one or more metadata bits to mark or flag a pointer, record information about a pointer, mark a pointer to assist with memory access protections (e.g., tag or color the pointer in a lock and key type security protection in which the tag or color of the pointer must match a tag or color of the data it points to), mark the pointer for uses in address sanitizer (ASAN) or jemalloc, mark the virtual address for a purpose associated with implementing garbage collection.

Figure 2B:
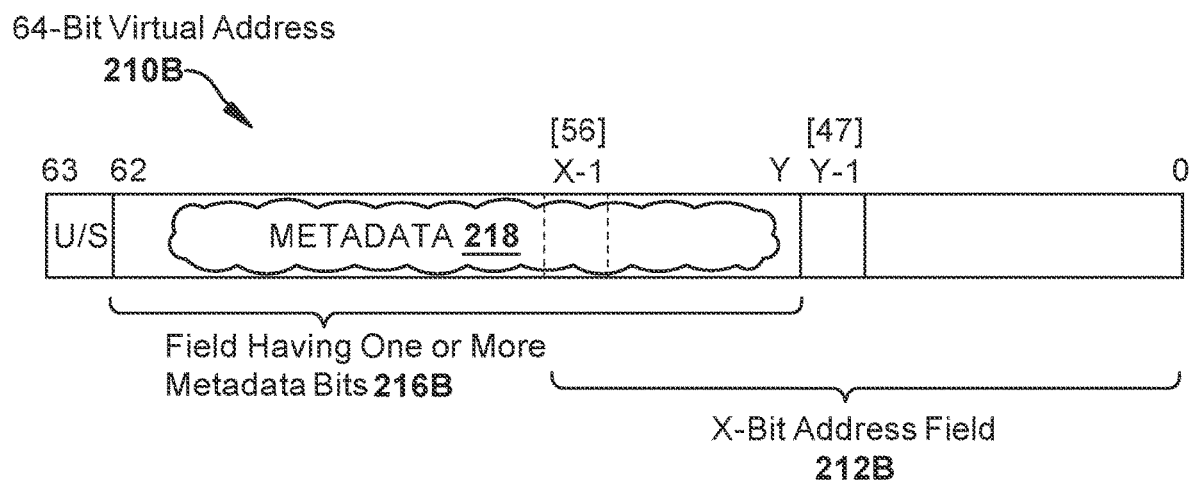
FIG. 2B is a block diagram of a second embodiment of a 64-bit virtual address.

FIG. 2B is a block diagram of a second embodiment of a 64-bit virtual address 210B. This second embodiment is similar to the first embodiment of FIG. 2A with a few differences that will be noted. As before, there is an X-bit address field 212B in bits [X−1:0]. By way of example, this X-bit address field may be a 57-bit address field and 57 bits may be used for address translation. However, in this second embodiment, one or more or all of the bits of the field [X−1:Y] may optionally be metadata bits, in addition to the bits [62:X], which may be used to store the metadata 218. For address translation, the processor may sign extend bit Y−1 to replace each of the original bits [X−1:Y]. The X-bit address with the bit (Y−1) sign extended into the bits [X−1:Y] may then be used as part of the address bits during address translation. By way of example, bit (Y−1) may be bit 47 and bit X−1 may be bit 56. By way of example, consider further an x86 example in which LAM_U_48 (which is described further below for FIG. 10) is enabled such that the fifteen bits [62:48] are metadata bits, and 5-level paging is being used such that 57-bit addressing is used. A canonicality check may be modified to selectively check that bits 47 and 63 match, and the address translation may still use 57-bit addressing, but bits [56:48] may be forced to have the value of bit 47 prior to address translation. This may allow actual address bits to be used as metadata bits to store additional metadata. One potential advantage of this is that it may help to allow a possibility of more than (64−X)-bits of the pointer to be used as metadata bits when the processor is currently operating with X-bits of address bits (e.g., 15 metadata bits instead of just 6 metadata bits in one example).

Figure 3:
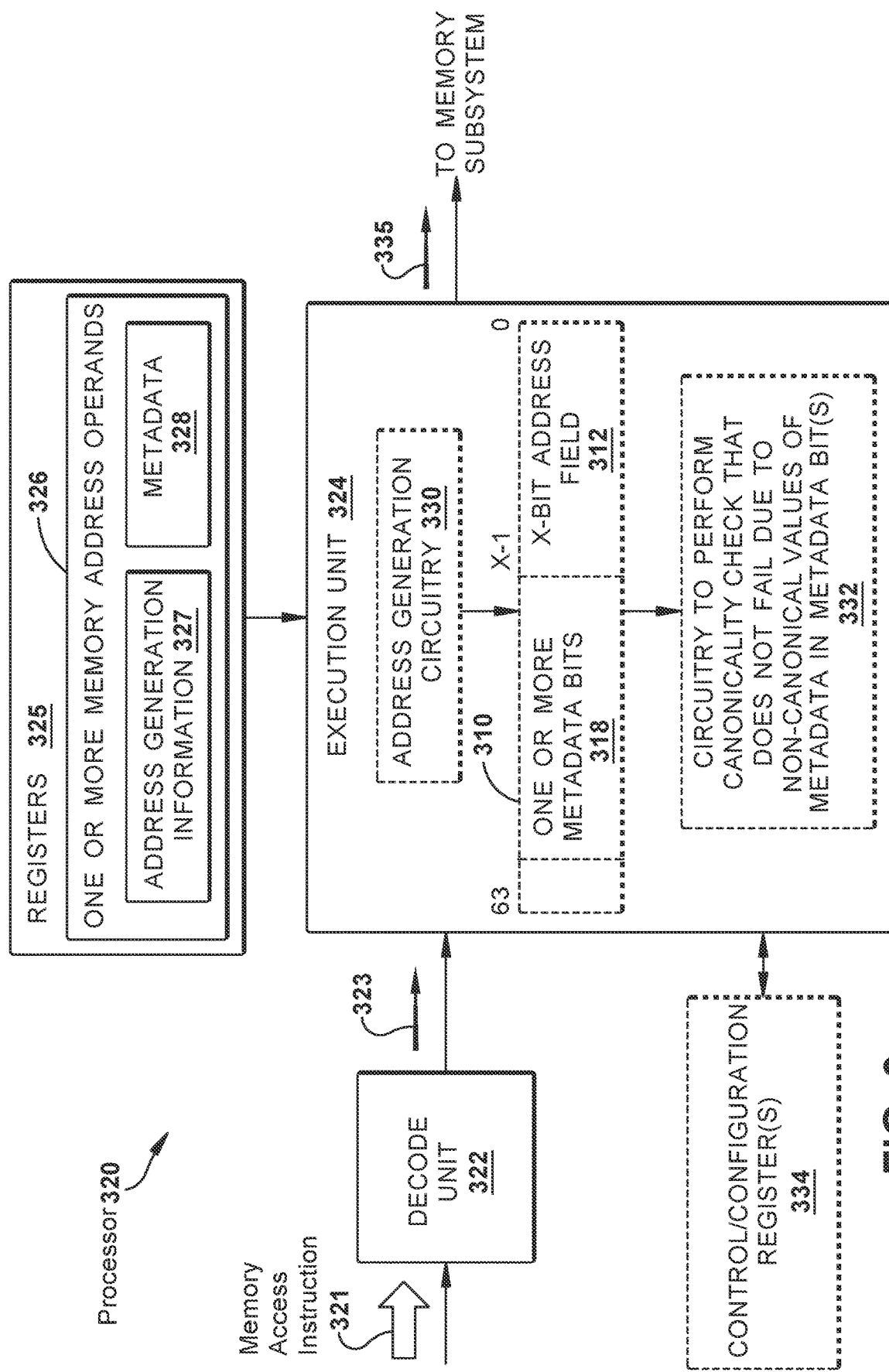
FIG. 3 is a block diagram of an embodiment of a processor.

FIG. 3 is a block diagram of an embodiment of a processor 320. In some embodiments, the processor may be a general-purpose processor (e.g., a general-purpose microprocessor or central processing unit (CPU) of the type used in desktop, laptop, servers, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures. In some embodiments, the processor may include (e.g., be disposed in) at least one integrated circuit or semiconductor die. In some embodiments, the processor may include at least some hardware (e.g., transistors, capacitors, diodes, circuitry, non-volatile memory storing circuit-level instructions/control signals, or the like).

The processor 320 may be coupled to receive a memory access instruction 321. For example, the instruction may be received from memory on an interconnect. The memory access instruction may represent any of various types of memory access instructions known in the art, such as, for example, a load from memory instruction, a store to memory instruction, a memory to memory move instruction, a gather instruction, a scatter instruction, or the like. The instruction may represent a macroinstruction, assembly language instruction, machine code instruction, or other instruction or control signal of an instruction set of the processor.

In some embodiments, the memory access instruction may explicitly specify (e.g., through one or more fields or bits in its encoding), or otherwise indicate (e.g., implicitly indicate by its opcode), one or more memory address operands 326 sufficient to allow generation of a 64-bit virtual address to be used to access memory. As shown, in some embodiments, the one or more memory address operands may often be stored in one or more registers 325 of the processor, such as, for example, general-purpose registers, vector registers (e.g., in the case of gather and scatter instructions), memory addressing registers (e.g., segment registers, segment selector register(s), extended segment selector register(s), or others depending upon the architecture), or a combination thereof. As one example, the instruction encoding may have a field or other set of bits to explicitly specify a register. As another example, a register may be implicit to the instruction (e.g., implicit to an opcode of the instruction) and the processor may implicitly or inherently understand to look in this implicit register when it recognizes this instruction (e.g., when it recognizes the opcode). A combination of approaches may also be used. In some embodiments, the one or more memory address operands may have address generation information 327 and metadata 328. In some embodiments, the metadata may be stored in a 64-bit register in the same bit positions that the metadata is to be stored in the 64-bit virtual address. Without limitation, the memory access instruction may also indicate one or more source operands having data to be stored to memory and/or one or more destination operands where data loaded from memory is to be stored, as well as potentially other operands. The actual memory access of the instruction, other than the fact that it uses a 64-bit virtual address, are not particularly relevant and so will not be described in detail, although these aspects may optionally be those of conventional memory access instructions.

The registers 325 may represent an on-die (or on integrated circuit) storage locations that are operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

Referring again to FIG. 3, the processor includes a decode unit 322 (e.g., a decode circuitry). The decode unit may be coupled to receive and may be operative to decode the memory access instruction. The decode unit may output one or more relatively lower-level instructions or control signals 323 (e.g., one or more microinstructions, micro-operations, micro-code entry points, decoded instructions or control signals, etc.), which reflect, represent, and/or are derived from the relatively higher-level memory access instruction. In some embodiments, the decode unit may include at least one input structure (e.g., a port, interconnect, or interface) coupled to receive the memory access instruction, an instruction recognition and decode logic coupled therewith to recognize and decode the memory access instruction, and at least one output structure (e.g., a port, interconnect, or interface) coupled therewith to select or output the lower-level instruction(s) or control signal(s). The decode unit and/or its instruction recognition and decode logic may be implemented using various instruction decode mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may include at least some hardware (e.g., one or more of transistors, integrated circuitry, on-die read-only memory or other non-volatile memory storing microcode or other hardware-level instructions, etc.). In some embodiments, the decode unit may be included on a die, integrated circuit, or semiconductor substrate.

Referring again to FIG. 3, an execution unit 324 (e.g., execution circuitry) is coupled with the decode unit 322 and the registers 325. In some embodiments, the execution unit may be on a die or integrated circuit (e.g., on die or integrated circuit with the decode unit). The execution unit may be coupled to receive the one or more decoded or otherwise converted instructions or control signals that represent and/or are derived from the memory access instruction. The execution unit may also be coupled to receive the one or more memory address operands 326, including the address generation information 327 and the metadata 328.

In some embodiments, the execution unit 324 may be or may include an address generation unit (AGU). The AGU is often included in the execution cluster of a processor as part of or coupled with an input to a memory access unit. The AGU is also sometimes referred to in the arts as an address computation unit (ACU). An AGU is a type of execution unit. Many processors include an AGU to generate addresses in parallel with the operation of another execution unit, such as a memory access unit (e.g., a load unit to execute load type instructions, a store unit to execute store type instructions, both a load unit and a store unit, a combined load and store unit (e.g., a load-store unit (LSU)) to execute both load type and store type instructions, etc.). The AGU may be operative to use the one or more memory address operands to generate the 64-bit virtual address 310 which the memory access unit may use to access memory. In some embodiments, the execution unit 324 may also include one or more of such memory access units (e.g., a load unit, a store unit, both a load unit and a store unit, a combined load and store unit, etc.). These memory access unit(s) are not shown in the illustration but may optionally be included as part of the execution unit 324. By way of example, in some embodiments, the execution unit 324 may include an AGU that is dedicated to or otherwise associated with a load unit of the execution unit, or is dedicated to or otherwise associated with a store unit of the execution unit, or is dedicated to or otherwise associated with both a load unit and a store unit of the execution unit, or is dedicated to or otherwise associated with a combined load and store unit of the execution unit, or is dedicated to or otherwise associated with another type of memory access unit.

The execution unit 324 may be operative in response to and/or due to the memory access instruction 321 (e.g., in response to one or more instructions or control signals decoded from the instruction and/or in response to the instruction being decoded and/or in response to control resulting from the instruction being provided to a decoder) to execute or otherwise perform operations used to implement the memory access instruction.

In some embodiments, the execution unit may be operative to generate a 64-bit virtual address 310 based on the one or more memory address operands 326. As shown, in some embodiments, the execution unit may optionally include address generation circuitry 330 (e.g., address generation circuitry of an address generation unit (AGU)) to generate the 64-bit virtual address. The virtual memory address may have an architecturally specified format and be generated from the memory operands using any of various architecturally specified addressing modes supported by the processor. Conventional approaches to generate the 64-bit virtual address from the memory operands may be used but are not required given that additional approaches for generating the 64-bit virtual address from the memory operands may be developed in the future and may be suitable. By way of example, in some embodiments, the execution unit may use one of the various conventional forms of a base+index*scale+displacement addressing mode, although the scope of the invention is not so limited. To further illustrate a possible example, various combinations of these parameters may be used for addressing, for example, just base, just base and index, just base and displacement, just base, index, and displacement, just base and (index times scale), just (index times Scale) plus displacement, and just base plus (index times scale) plus displacement. The scale may represent a constant (e.g., 2-bit constant) such as 1, 2, 4, or 8, the index may commonly be included in a register (e.g., a 64-bit general purpose register), the base may commonly be included in a register (e.g., a 64-bit general purpose register), and the displacement may include an integral offset. Commonly, the metadata 328 may be included in the base, and in some embodiments the one or more metadata bits may have the same bit positions in the base (e.g., same bit positions in a 64-bit register) as in the 64-bit virtual address 310.

Referring again to FIG. 3, the 64-bit virtual address 310 may have a bit 63, an X-bit address field 312 starting at a bit 0 up to a bit (X−1) to store an X-bit address generated from the address generation information 327. In some embodiments, the 64-bit virtual address may also have one or more metadata bits 318 that may each be used to store a corresponding bit of the metadata 328. In some embodiments, the one or more metadata bits are included in the bits [62:X] of the 64-bit virtual memory address that are conventionally checked by the canonicality check and/or are conventionally required by the processor to be canonical. In various embodiments, there may be 1, 2, 3, 4, 5, 6, 7, 8, 9, 10, 11, 12, 13, 14, 15, or more metadata bits. In some embodiments, the one or more metadata bits may be more than eight metadata bits (i.e., more than a byte) which helps to provide more metadata bits for software to utilize. In some embodiments, the entire field of bits [62:X] may be metadata bits. In some embodiments, the one or more metadata bits may be a selectable, configurable, or controllable one of two or more different possible numbers of metadata bits. For example, in some embodiments fifteen metadata bits may be configured where 48-bit addresses are being used, and in other embodiments six metadata bits may be configured where 57-bit addresses are being used. Alternatively, only some of these bits may optionally be available as metadata bits. In still other embodiments, one or more of the actual address bits may be made available to store metadata and then sign extended or otherwise made canonical prior to address translation, similarly to what was described for FIG. 2B. The ability to configure/control different numbers of metadata bits may help to provide more flexibility to software on the use of metadata. Now it is to be appreciated that reference to metadata bits (i.e., the bit positions in the 64-bit virtual address) indicates those bits or bit positions are made available to software to store metadata in them and do not required that software actually does use those bits or bit positions to store metadata. In some embodiments, bit 63 is not a metadata bit.

Referring again to FIG. 3, in some embodiments, the execution unit may be operative to perform a canonicality check on the 64-bit virtual address 310 that does not fail due to any non-canonical values of the metadata stored in any of the one or more metadata bits. As shown, in some embodiments, the execution unit may optionally include circuitry 332 to perform a canonicality check that does not fail due to any non-canonical values of the metadata stored in any of the one or more metadata bits. Even though there are one or more metadata bits in positions that are conventionally included in the canonicality check and/or required to be canonical, and even though the one or more metadata bits may store non-canonical bit values, the processor is adapted, configured, or otherwise operable (e.g., has circuitry to) allow the canonicality check to be performed and succeed even when the metadata bits have non-canonical values. In some embodiments, the canonicality check may be performed in an AGU and beyond the AGU the X-bit address may propagate not the one or more metadata bits.

In some embodiments, the execution unit may be operative to prevent any non-canonical values of the metadata stored in any of the one or more metadata bits from being used in the canonicality check and/or causing the canonicality check to fail. This may be done in different ways in different embodiments. In some embodiments, the execution unit to may be operative to perform the canonicality check by checking at least the bit 63 and the bit (X−1) for canonicality but omitting checking or not checking any of the one or more metadata bits for canonicality. The bit 63 and the bit (X−1) and optionally one or more other non-metadata bits may be selectively used in the canonicality check but the one or more metadata bits may not be used in the canonicality check or checked for canonicality. In some embodiments, the execution unit is not to check any of bits [62:X] for canonicality leaving any of these potentially available to software to store metadata. This may involve changing the way a canonicality check is conventionally performed and/or performing the canonicality check in a way that or such that the metadata bits do not cause the canonicality check to fail. Further details of one example embodiment of how this may optionally be done will be described below regarding FIGS. 7-9. In other embodiments, the execution unit may be operative to (e.g., may include circuitry to) make the one or more metadata bits canonical prior to the performance of the canonicality check (e.g., change any and all of the one or more metadata bits that have non-canonical values so that they have canonical values. Further details of one example embodiment of how this may optionally be done will be described below regarding FIGS. 5-6.

In some embodiments, the execution unit may also optionally be operative to provide at least the X-bit address field 312 of the 64-bit virtual address 310 as part of a memory access operation 335 to other components of a memory subsystem. For example, the X-bit address may be provided to a memory access unit, or a memory access unit may use the X-bit address for a memory access operation. In some embodiments, the metadata may not be sent from the execution unit and the interactions with the other components of a memory subsystem may be generally conventional.

The execution unit and/or the processor may include specific or particular logic (e.g., transistors, integrated circuitry, or other hardware potentially combined with firmware (e.g., instructions stored in non-volatile memory) and/or software) that is operative to perform the canonicality check on the 64-bit virtual address 310 that does not fail due to any non-canonical values of the metadata stored in any of the one or more metadata bits. In some embodiments, the execution unit may include one or more input structures (e.g., a port, interconnect, or interface) coupled to receive the one or more memory address operands, circuitry or logic coupled therewith to receive and process the one or more memory address operands, and one or more output structures (e.g., a port, interconnect, or interface) coupled therewith to output at least an address portion of the 64-bit virtual address, issue load and/or store operations, etc. In some embodiments, the execution unit may include the circuitry, logic, or components shown and described for any one or more of FIGS. 5-9, although the scope of the invention is not so limited.

Referring again to FIG. 3, in some embodiments the processor may optionally include one or more control and/or configuration registers 334 coupled with the execution unit 324. Examples of suitable registers include, but are not limited to, control registers (e.g., CR3, CR4), model or machine specific registers (MSRs), and the like. In some embodiments, the one or more control and/or configuration registers may store control and/or configuration information to control and/or configure one of multiple (e.g., at least two or optionally three or more) possible numbers of the one or more metadata bits. By way of example, the control and/or configuration information may select between the number of the one or more metadata bits being six metadata bits, fifteen metadata bits, or some other number of metadata bits. In some embodiments, there may optionally be one set of such control and/or configuration information for user-level 64-bit virtual addresses and another set of such control and/or configuration information for supervisor-level 64-bit virtual addresses. Software may configure such control and/or configuration information e.g., by writing to the one or more control and/or configuration registers To avoid obscuring the description, a relatively simple processor 320 has been shown and described. However, the processor may optionally include other processor components. For example, the processor may also optionally include a storage (e.g., an instruction cache) to store the memory access instruction, an optionally register rename, allocation, and schedule unit or circuitry to rename and allocate registers and schedule execution of operations, an optional write back circuitry to write back results of execution, and an optional register file to include the registers. In other example, the processor may additionally optionally include various combinations and configurations of the components shown and described for any of FIGS. 11B, 12A/B, and 17. All the components of the processor may be coupled together to allow them to operate as intended.

Accordingly, in some embodiments, the metadata bits may be handled appropriately by hardware in conjunction with the canonicality check to avoid non-canonical values of the metadata bits causing the canonicality check to fail. Another possible approach is for software to process the one or more metadata bits to prevent them from causing the canonicality check to fail, although such approaches generally tend to be complex and/or to incur a high overhead to implement. To further illustrate certain concepts, a few example approaches will be described.

In one example approach, the software may locate metadata in meaningful address bits and create aliases such that some top-most address bits in each alias mapping can be interpreted as metadata. However, potential drawbacks to this approach include that it may tend to introduce overhead in additional translation lookaside buffer (TLB) pressure due to creation of alias mappings which may tend to reduce performance and/or restrict the amount of memory addressable by the software.

In another example approach, the software may locate metadata in bits beyond address bit width, but software may make the pointer canonical prior to dereferencing the pointer. This approach generally involves overhead of compiler generated instrumentation in the form of additional instructions that need to be performed to make the pointer canonical prior to making a memory access, by saving away the metadata bits before the access, and restoring them after the access has been made (e.g., to preserve the metadata across dereference).

In a further example, approach, software may locate metadata in a separate table that is indexed using the pointer address. This technique tends to incur overhead of additional memory for this separate table and overhead of additional compiler generated instrumentation that need to be performed to index into this table to update the metadata bits and to access the metadata bits for intended usages.

The approaches described herein generally help to avoid such software complexities and/or reduce such overheads and/or improve performance and/or reduce power consumption (e.g., through more efficient performance) by allowing software to include metadata in pointers without having to perform such approaches. This may benefit software such as address sanitizer instrumentation (ASAN), jemalloc, and others.

Figure 4:
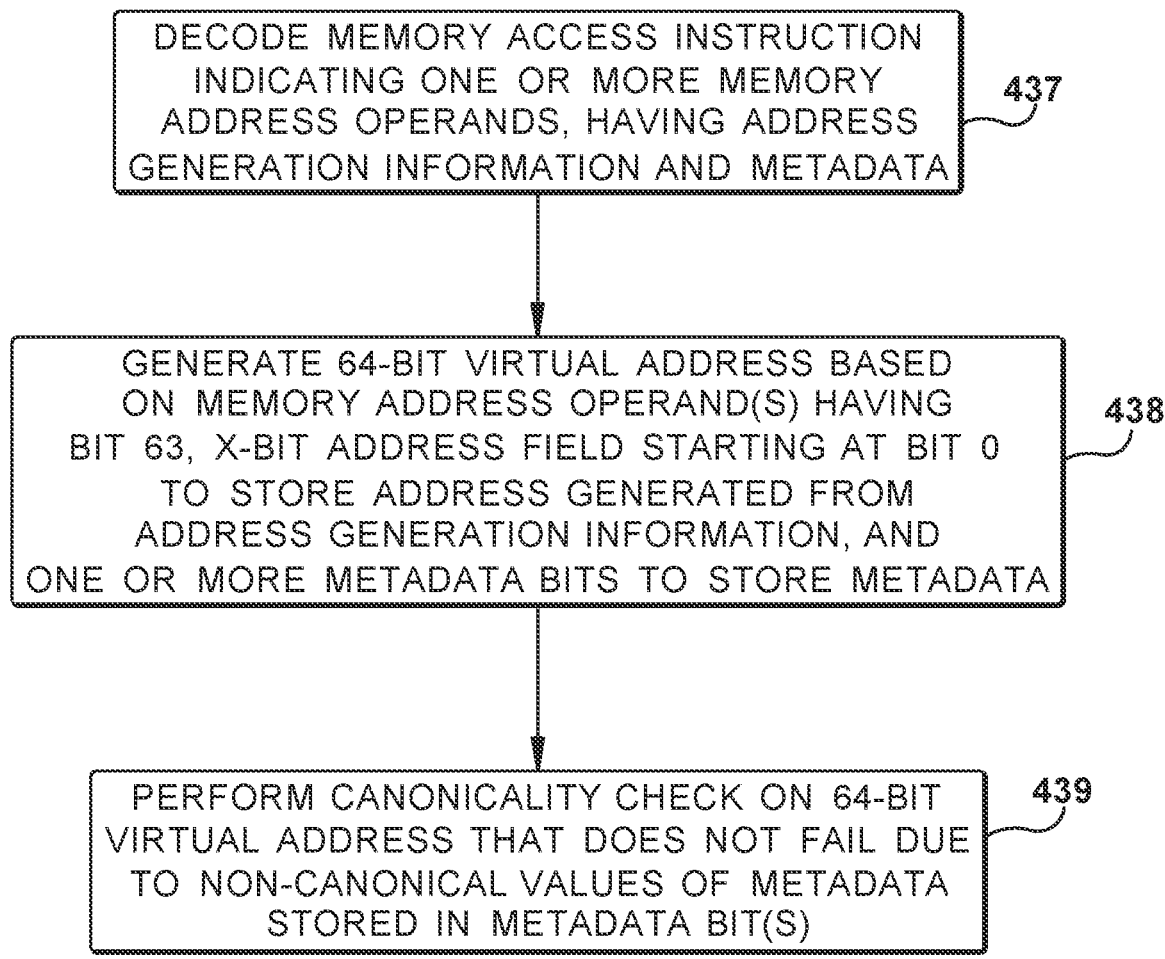
FIG. 4 is a block flow diagram of an embodiment of a method.

FIG. 4 is a block flow diagram of an embodiment of a method 436. In various embodiments, the method may be performed by a processor, instruction processing apparatus, digital logic device, or integrated circuit. In some embodiments, the method may be performed by and/or with the processor 320 of FIG. 3. The components, features, and specific optional details described herein for the processor 320, also optionally apply to the method 436. Alternatively, the method 436 may be performed by and/or within a similar or different processor or apparatus. Moreover, the processor 320 may perform methods the same as, similar to, or different than the method 436.

A memory access instruction is decoded, at block 437. The memory access instruction may indicate one or more memory address operands. The one or more memory address operands having address generation information and metadata.

A 64-bit virtual address is generated based on the one or more memory address operands, at block 438. The 64-bit virtual address may have a bit 63, an X-bit address field starting at a bit 0 storing an address generated from the address generation information, and one or more metadata bits storing the metadata. In some embodiments, the one or more metadata bits comprise a metadata field from a bit 62 to a bit X of the 64-bit virtual address. In some embodiments, the one or more metadata bits comprises either one of 6 bits or 15 bits.

A canonicality check is performed on the 64-bit virtual address that does not fail due to non-canonical values of the metadata stored in the one or more metadata bits, at block 439. In some embodiments, this may include performing one or more of the various operations shown and described further below for FIGS. 5-9.

Figure 5:
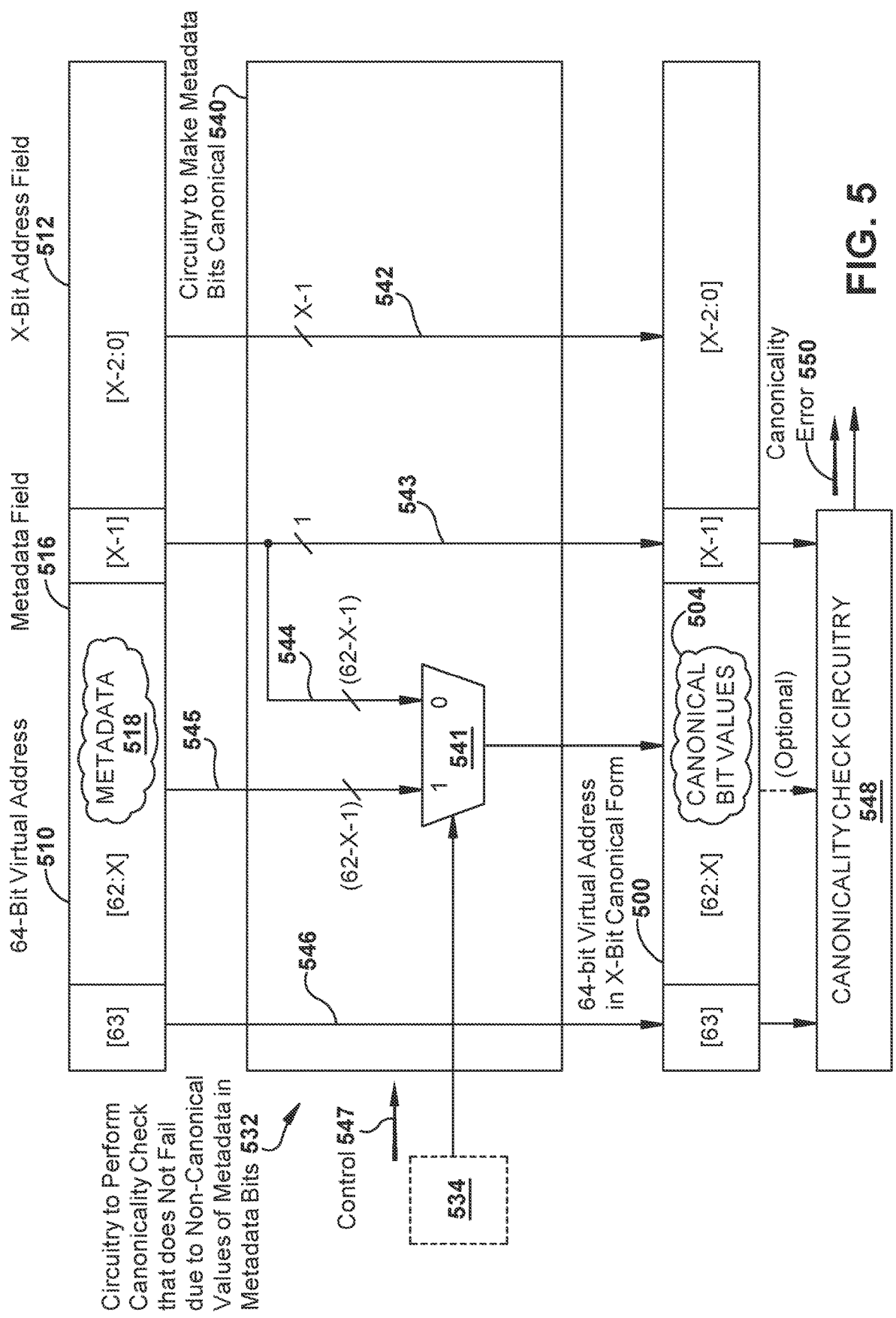
FIG. 5 is a block diagram of a first example embodiment of circuitry to perform a canonicality check that does not fail due to any non-canonical values of metadata stored in any of one or more metadata bits.

FIG. 5 is a block diagram of a first example embodiment of circuitry 532 to perform a canonicality check that does not fail due to any non-canonical values of metadata stored in any of one or more metadata bits. An embodiment of a 64-bit virtual address 510 is also shown. The 64-bit virtual address has an X-bit address field 512 in bits [X−1:0] to store an X-bit virtual address. Bit (X−1) is the most significant bit of the X-bit address field. In some embodiments, the X-bit address field may be 48-bits or 57-bits, although this is not required. The 64-bit virtual address also has a bit 63. In some embodiments, bit 63 may store a user-level or supervisor-level (U/S) indicator bit that may be cleared to binary zero to indicate that the 64-bit virtual address is user-level or set to binary one to indicate that the 64-bit virtual address is supervisor-level. The 64-bit virtual address also has a field [62:X] between the bit 63 and the bit (X−1). In some embodiments, the field [62:X] may include one or more metadata bits. The previously described numbers of the one or more metadata bits are suitable. In this particular example, the bits [62:X] represent a metadata field 516 in which all the bits [62:X] are metadata bits, and software may choose to use any or all of the bits [62:X] to store one or more corresponding bits of metadata. In other embodiments only a subset of any one or more of bits [62:X] may be metadata bits. Those skilled in the art and having the benefit of the present disclosure will appreciate that the approach described below for the metadata field 516 may optionally be applied analogously to smaller metadata fields and/or individual metadata bits.

The 64-bit virtual address 510 may be provided to circuitry 540 that is operative to make the one or more metadata bits canonical. This may represent masking the actual values of the metadata bits (e.g., some of which may be non-canonical) with canonical valued bits. In this particular example, the circuitry is operative to make all bits of the metadata field 516 canonical, although the scope of the invention is not so limited. The circuitry 540 may generate a 64-bit virtual address 500 in X-bit canonical form from the received 64-bit virtual address 510. As shown by a first downward line 542, the circuitry may copy or otherwise store (X−1) bits from the least significant bits [X−2:0] of the 64-bit virtual address 510 to bits [X−2:0] of the 64-bit virtual address 500. As shown by a second downward line 546, the circuitry may copy or otherwise store bit 63 of the 64-bit virtual address 510 to bit 63 of the 64-bit virtual address 500. As shown by a third downward line 543, the circuitry may copy or otherwise store bit (X−1) of the 64-bit virtual address 510 to bit (X−1) of the 64-bit virtual address 500.

In this particular example involving the metadata field 516, as shown by fourth line 544, enough copies of bit (X−1) to fill each of bits [62:X] in the 64-bit virtual address 500 may also be provided to a first input (labeled 0) of a multiplexer or other selection circuit 541. In an alternate embodiment, instead of using bit (X−1) the bit 63 could optionally be used instead or one or more non-metadata bits among bits [62:X] could optionally be used instead. Likewise, in this particular example involving the metadata field 516, as shown by fifth line 545, each of bits [62:X] may be provided to a second input (labeled 1) of the selection circuit 541.

Control 547 is also provided to the selection circuit 541 to control it to select either the bits provided to the first input (labeled 0) or the second input (labeled 1) for storage to the bits [62:X] of the 64-bit virtual address 500. By way of example, the control may indicate whether the use of the one or more metadata bits is enabled (e.g., turned on) or disabled (e.g., turned off). When enabled, the control may cause the copies of bit (X−1) provided to the first input (labeled 0) of the selection circuit to be provided or stored in the bits [62:X] of the 64-bit virtual address. The circuitry may make or ensure that all the bits [62:X] of the 64-bit virtual address are identical to or match the value of bit (X−1). This may effectively convert or change any and all of the bits [62:X] of the 64-bit virtual address 510 having noncanonical values due to the metadata 518 to be canonical bit values 504 that will not cause a canonicality check to fail.

When disabled, the control may cause the bits [62:X] provided to the second input (labeled 1) of the selection circuit to be provided or stored in the bits [62:X] of the 64-bit virtual address 500. Such control 547 may optionally be provided from one or more control and/or configuration registers 534. In other embodiments, the use of the one or more metadata bits may optionally always be enabled (e.g., turned on) such that there is no need for the selection circuit but rather the copies of bit (X−1) may be statically provided or stored in the bits [62:X] of the 64-bit virtual address.

The circuitry 532 also includes canonicality check circuitry 548 that is operative to perform a canonicality check. In some embodiments, in this particular example involving the metadata field 516, since the circuitry 540 has ensured that all the one or more metadata bits are canonical, only bit 63 and bit (X−1) may optionally be provided to the canonicality check circuit, and only bit 63 and bit (X−1) may be used to perform the canonicality check. In other embodiments, since the circuitry 540 has ensured that all the one or more metadata bits are canonical, any additional or all of the bits [62:X] may optionally also be provided to the canonicality check circuitry. The canonicality check circuitry may perform the canonicality check. If the canonicality check fails (e.g., at least one of the checked bits is not canonical), a canonicality error (e.g., a canonicality fault, a general-protection exception (GP #), or the like, may be raised, signaled, or otherwise caused. If the canonicality check succeeds (e.g., all the bits checked are canonical), the canonicality error may not be caused.

Figure 6:
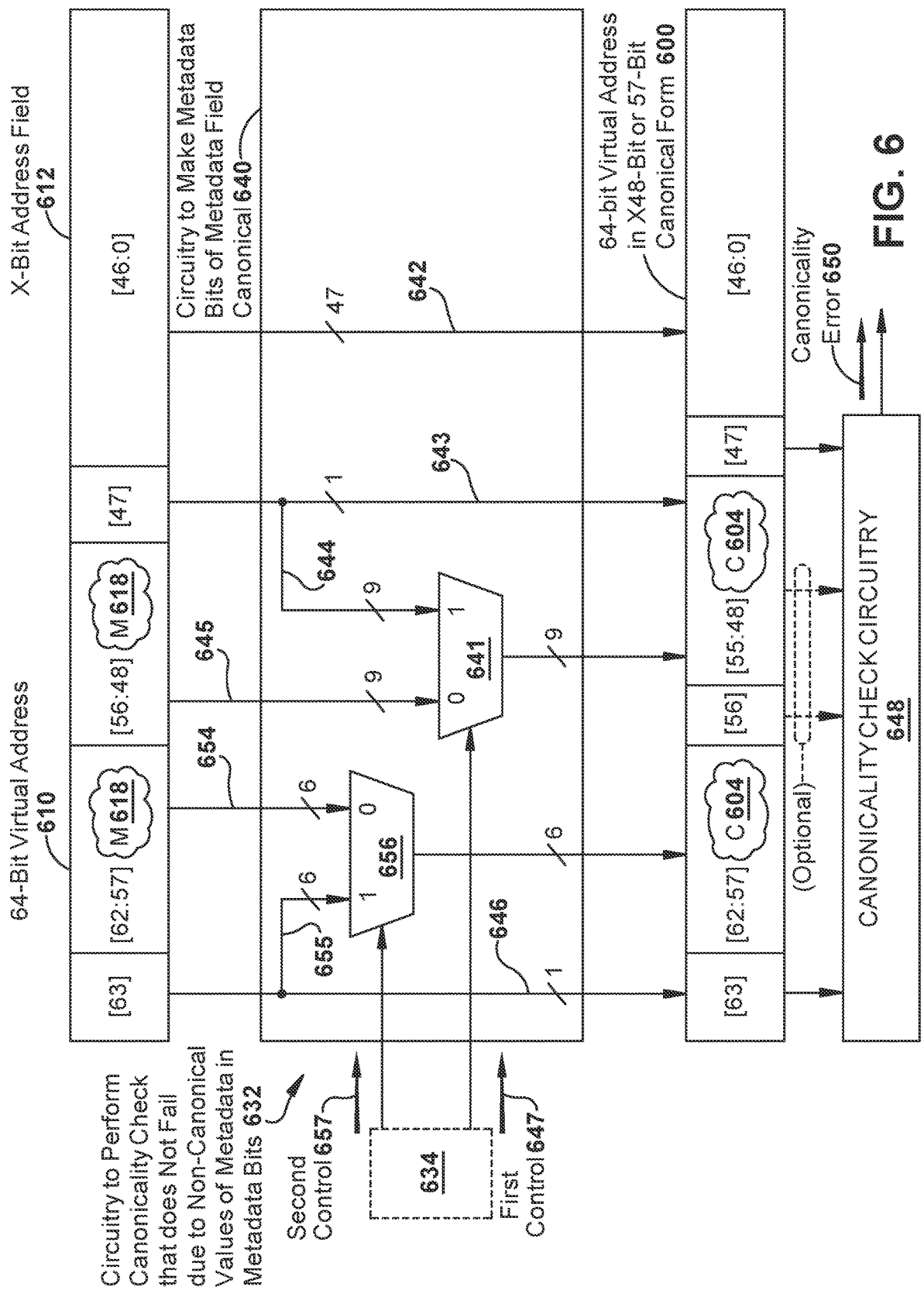
FIG. 6 is a block diagram of a second more detailed example embodiment of circuitry to perform a canonicality check that does not fail due to any non-canonical values of metadata stored in any of one or more metadata bits.

FIG. 6 is a block diagram of a second more detailed example embodiment of circuitry 532 to perform a canonicality check that does not fail due to any non-canonical values of metadata stored in any of one or more metadata bits. Aside from FIG. 6 having two possible metadata ranges with specific bit positions it is otherwise similar to FIG. 5 and may have similar alternatives and variations. To avoid obscuring the description, the different and/or additional aspects will primarily be described without repeating all the aspects that may be the same or similar.

An embodiment of a 64-bit virtual address 610 has a 47-bit address field 612 in bits [46:0] to store a 47-bit virtual address. The 64-bit virtual address also has a bit 63 which may store a user-level or supervisor-level (U/S) indicator bit. The 64-bit virtual address also has a first field of bits [56:48] and a second field of bits [62:57]. In some embodiments, either one or both fields may represent a metadata field to store metadata 618. In other embodiments, either the first field of bits [56:48] may represent a metadata field to store metadata, or both the first field of bits [56:48] and the second field of bits [62:57] may represent a metadata field to store metadata.

The 64-bit virtual address 610 may be provided to circuitry 640 that is operative to make the first field of bits [56:48] and/or the second field of bits [62:57] canonical. This may represent masking the actual values of the metadata bits (e.g., some of which may be non-canonical) with canonical valued bits. The circuitry 640 may generate a 64-bit virtual address 600 in either 48-bit or 57-bit canonical form from the received 64-bit virtual address 610.

As shown by a first downward line 642, the circuitry may copy or otherwise store 47 bits from bits [46:0] of the 64-bit virtual address 610 to bits [46:0] of the 64-bit virtual address 600. As shown by a second downward line 643, the circuitry may copy or otherwise store bit 47 of the 64-bit virtual address 610 to bit 47 of the 64-bit virtual address 600. As shown by a third downward line 646, the circuitry may copy or otherwise store bit 63 of the 64-bit virtual address 610 to bit 63 of the 64-bit virtual address 600.

In this particular example involving the first field of bits [56:48], as shown by fourth line 644, nine copies of bit 47 sufficient to fill bits [56:48] in the 64-bit virtual address 600 may also be provided to a first input (labeled 1) of a first multiplexer or other selection circuit 641. In an alternate embodiment, bit 63 could optionally be used instead of using bit 47. Likewise, in this particular example involving the first field of bits [56:48], as shown by fifth line 645, each of the nine bits [56:48] may be provided to a second input (labeled 0) of the first selection circuit 641. These bits [56:48] may be used to store one or more metadata bits.

In this particular example involving the second field of bits [62:57], as shown by sixth line 655, six copies of bit 63 sufficient to fill bits [62:57] in the 64-bit virtual address 600 may also be provided to a first input (labeled 1) of a second multiplexer or other selection circuit 656. In an alternate embodiment, bit 47 could optionally be used instead of using bit 63. Likewise, in this particular example involving the second field of bits [62:57], as shown by seventh line 654, each of the six bits [62:57] may be provided to a second input (labeled 0) of the second selection circuit 656. These bits [62:57] may be used to store one or more metadata bits.

A first control 647 may be provided to the first selection circuit 641. The first control may indicate or control whether the first field of bits [56:48] is enabled as a metadata field or not. When the first field of bits [56:48] is enabled as a metadata field, the first control may control the first selection circuit to select the nine copies of bit 47 provided to the first input (labeled 1) for storage in the bits [56:48] of the 64-bit virtual address 600. This may ensure that all the bits [56:48] of the 64-bit virtual address 600 are identical to or match the value of bit (47). Conversely, when the first field of bits [56:48] is not enabled as a metadata field, the first control may control the first selection circuit to select the nine bits [56:48] provided to the second input (labeled 0) for storage in the bits [56:48] of the 64-bit virtual address 600.

Second control 657 may be provided to the second selection circuit 656. The second control may indicate or control whether the second field of bits [62:57] is enabled as a metadata field or not. When the second field of bits [62:57] is enabled as a metadata field, the second control may control the second selection circuit to select the six copies of bit 63 provided to the first input (labeled 1) for storage in the bits [62:57] of the 64-bit virtual address 600. This may ensure that all the bits [62:57] of the 64-bit virtual address 600 are identical to or match the value of bit (63). Conversely, when the second field of bits [62:57] is not enabled as a metadata field, the second control may control the second selection circuit to select the six bits [62:57] provided to the second input (labeled 0) for storage in the bits [62:57] of the 64-bit virtual address 600.

The first and second control may optionally be provided from one or more control and/or configuration registers 634. They may each represent a control signal indicative of and/or based on the values of one or more control and/or configuration bits in a control and/or configuration register. In other embodiments, the use of the one or more metadata bits may optionally always be enabled (e.g., turned on) such that there is no need for the first and second selection circuits, but rather the copies of bit 47 and/or 63 may be statically provided or stored in all of bits [62:57] and/or bits [56:48] of the 64-bit virtual address 600.

The circuitry 632 also includes canonicality check circuitry 648 that is operative to perform a canonicality check. In some embodiments, since the circuitry 640 has ensured that, if bits [62:57] and/or bits [56:48] are enabled to contain one or more metadata bits, then the bits in these fields are made canonical prior to the canonicality check, only bit 63 and bit 47 may optionally be provided to the canonicality check circuit, and only bit 63 and bit 47 may be used to perform the canonicality check. In other embodiments, since the circuitry 640 has ensured that, if bits [62:57] and/or bits [56:48] are enabled to contain one or more metadata bits, then the bits in these fields are made canonical prior to the canonicality check, any additional or all the bits [62:57] and/or [56:48] may optionally also be provided to the canonicality check circuitry and used to perform the canonicality check. The canonicality check circuitry may perform the canonicality check. If the canonicality check fails (e.g., at least one of the checked bits is not canonical), a canonicality error (e.g., a canonicality fault, a general-protection exception (GP #), or the like, may be raised, signaled, or otherwise caused. If the canonicality check succeeds (e.g., all the bits checked are canonical), the canonicality error may not be caused.

Figure 7:
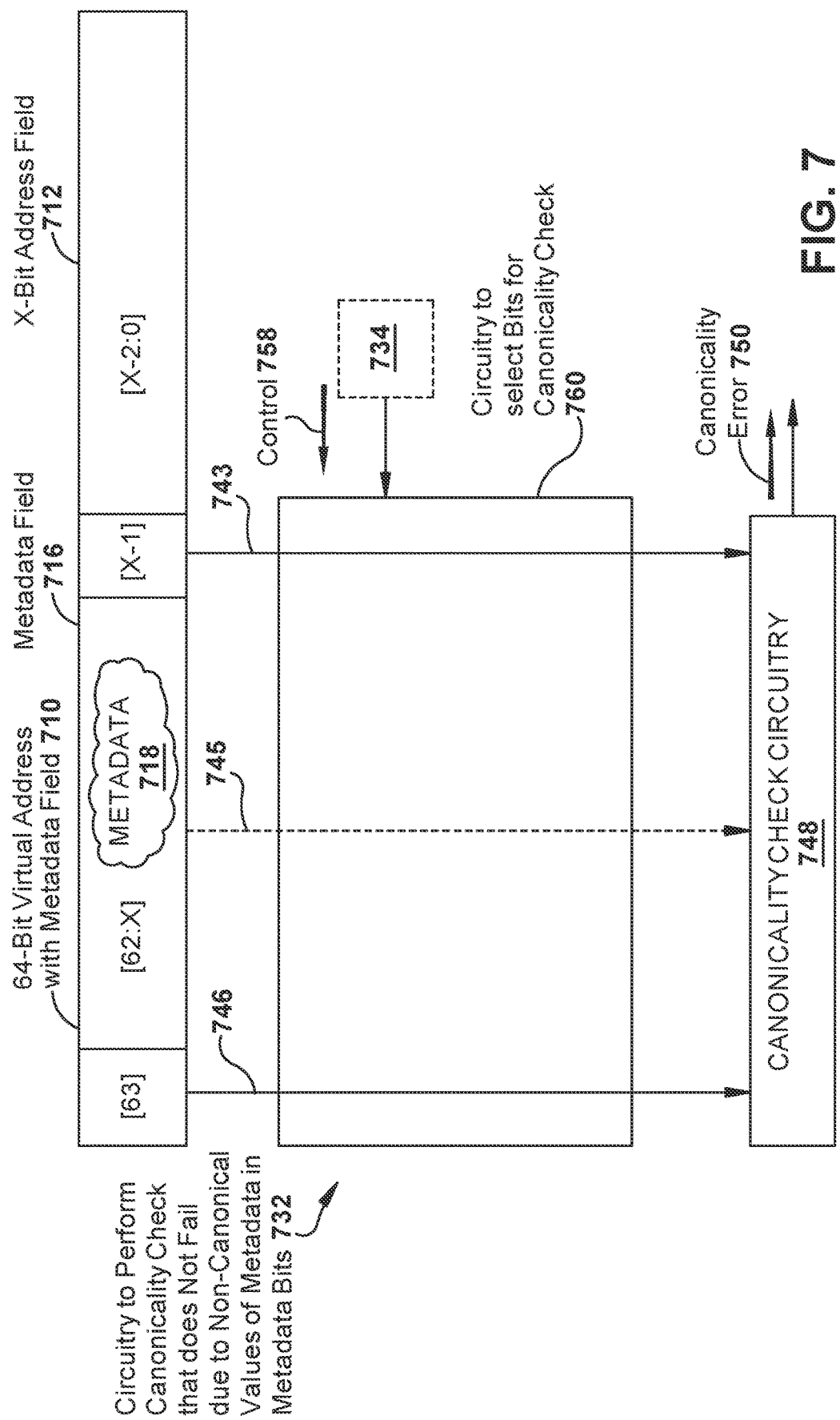
FIG. 7 is a block diagram of a third example embodiment of circuitry to perform a canonicality check that does not fail due to any non-canonical values of metadata stored in any of one or more metadata bits.

FIG. 7 is a block diagram of a third example embodiment of circuitry 732 to perform a canonicality check that does not fail due to any non-canonical values of metadata stored in any of one or more metadata bits. An embodiment of a 64-bit virtual address 710 is also shown. The 64-bit virtual address has an X-bit address field 712 in bits [X−1:0] to store an X-bit virtual address, which in some embodiments may be 48-bits or 57-bits.

The 64-bit virtual address also has a field of bits [62:X], between the bit 63 and the bit (X−1), which may include one or more metadata bits available to store metadata 718. The previously described numbers of the one or more metadata bits are suitable. In this particular example, the bits [62:X] represent a metadata field 716 in which all the bits [62:X] are metadata bits available to store the metadata 718. In other embodiments only a subset of any one or more of bits [62:X] may be one or more metadata bits.

The 64-bit virtual address 710 may be provided to circuitry 760 that is operative to select bits of the 64-bit virtual address 710 for the canonicality check. In some embodiments, the circuitry may select only a subset of the bits that are conventionally included in a canonicality check for the canonicality check. For example, only a subset of bits [63:X−1] may be selected for the canonicality check. In doing so, the circuitry may be operative to prevent any of one or more metadata bits able to store metadata and therefore potentially have a non-canonical value from being selected for and used in the canonicality check and/or causing the canonicality check to fail.

In some embodiments, the circuitry to may be operative to select the bit 63 for the canonicality check, as shown by a first downward line 746, and select the bit (X−1) for the canonicality check, as shown by a second downward line 743. In such embodiments, as shown by a third dashed downward line 745, the circuitry may optionally be operative to select one or more additional bits from the field of bits [62:X], if they are not metadata bits used to store the metadata 718. However, the circuitry may omit selecting any and all of one or more metadata bits from the field of bits [62:X] used to store the metadata 718. In some embodiments, the circuitry may optionally not select any of bits [62:X] for the canonicality check, thereby leaving any of these bits [62:X] available to software to use to store the metadata 718. Alternatively, in other embodiments only a subset of the bits [62:X] may be metadata bits used to store the metadata 718 (e.g., only bits 62, 61, and 60), and only the subset of metadata bits would not be selected for the canonicality check, while others of the bits [62:X] (e.g., bits [59:X]) may be selected for the canonicality check. The bits that are not metadata bits are not used to store the metadata 718 and therefore do not need to have potentially non-canonical values that would cause the canonicality check to fail.

Control 758 is also provided to the circuitry 760 to control which bits are selected for the canonicality check. By way of example, the control may indicate whether the use of the one or more metadata bits is enabled (e.g., turned on) or disabled (e.g., turned off). When enabled, the control may control or otherwise cause the circuitry to select only the subset of the bits for the canonicality check as discussed above. In other embodiments, the use of the one or more metadata bits may optionally always be enabled (e.g., turned on). In some embodiments, the control may control which bits are the one or more metadata bits (e.g., the value of X, select a subset of the bits [62:X], and so on). When disabled, the control may optionally cause all the bits [63:X−1] to be selected for the canonicality check. Such control 758 may optionally be provided from one or more control and/or configuration registers 734.

The circuitry 732 also includes canonicality check circuitry 748 that is operative to perform a canonicality check. In some embodiments, the canonicality check circuitry may perform the canonicality check on only the subset of the bits [63:X−1] which have been selected for the canonicality check by the circuitry 760, as discussed above. The one or more metadata bits may not be included in the canonicality check and/or may be ignored by the canonicality check. This may involve changing the way the canonicality check is performed and/or performing the canonicality check in a way that or such that the one or more metadata bits do not cause the canonicality check to fail. Conventionally, all the bits [63:X−1] may have been used in the canonicality check. The canonicality check may check or ensure that all bits included in the canonicality check match and match the most significant address bit (X−1). In some embodiments, only bit 63 and the most significant address bit (X−1) may be used to perform the canonicality check. The canonicality check may ensure that bit 63 matches the most significant address bit (X−1). In some such embodiments, bit (X−1) may be bit 47 or bit 56. In other embodiments, other non-metadata bits may optionally be included. For example, in some cases where only bits [62:57] are used to store metadata, bit 63 and some or all of bits [56:47] may optionally be included in the canonicality check. If the canonicality check fails (e.g., at least one of the checked bits is not canonical), a canonicality error (e.g., a canonicality fault, a general-protection exception (GP #), or the like, may be raised, signaled, or otherwise caused. If the canonicality check succeeds (e.g., all the bits checked are canonical), the canonicality error may not be caused.

Advantageously, including the bit 63 in the canonicality check, and enforcing the bit 63 to match the most significant address bit [X−1], may help to preserve bit 63 based canonicality and help to allow a path to the use (e.g., in the future) of 64-bit address bits. This may also help to avoid compatibility issues with applications enabled for 48-bit and/or 57-bit addresses from executing on a 64-bit address enabled kernel. As such an OS may continue to use the bit 63 to encode whether the pointer is a user pointer or a supervisor pointer. Also, on a processor that supports 64-bit virtual addresses, a configuration may exist that would still allow bits [62:57] as metadata or bits [62:48] as metadata to allow applications that used these metadata to continue to execute. Here the metadata is not in unused address bits, but some used address bits are masked. If the use of bit 63 as the user/supervisor indicator bit were not preserved, then the OS may not know which bit to test for determining user/supervisor. Also, software (e.g., the operating system, drivers, etc.) may continue to use bit 63 as a user-level or supervisor-level identifier for the virtual address.

The illustrated example shows a single metadata field 716. However, other embodiments are contemplated in which there could be two or more metadata fields, similarly to what was shown and described for FIG. 6. A similar approach may be used in which the bits in these metadata fields when enabled to be used to store metadata are not selected for and are not used in the canonicality check, but they may be selected for an included in the canonicality check when they are not enabled to be used to store metadata.

Figure 8:
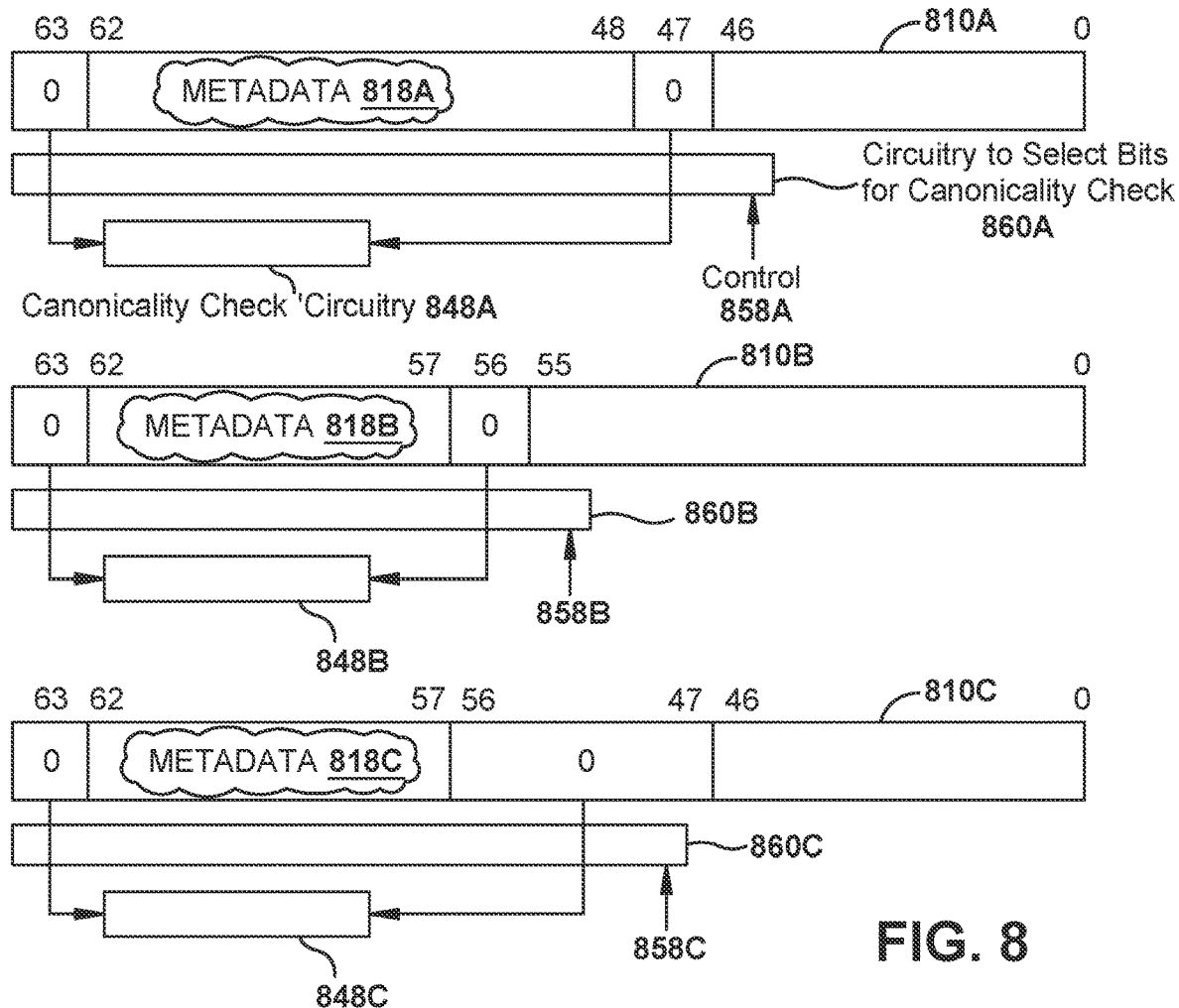
FIG. 8 is a block diagram showing different metadata field widths, and bits used in canonicality checks, for user-level 64-bit virtual addresses, according to some embodiments.

FIG. 8 is a block diagram showing different metadata field widths, and bits selected for and used in canonicality checks, for user-level 64-bit virtual addresses, according to some embodiments. It is to be appreciated that these are only example embodiments, and that other embodiments are not so limited.

In a first example, a first 64-bit virtual address 810A is shown. A first circuitry 860A to select bits for a canonicality check is coupled to receive the first 64-bit virtual address 810A. The first circuitry 860A is operative to select bits for the canonicality check according to a first control 858A. In this first example, the first control 858A indicates that 48-bit addressing is to be used. Bits [62:48] represent a metadata field that can store metadata 818A. In some embodiments, for this first control, and irrespective of the paging mode active, the first circuitry 860A may be controlled to select only bits 63 and 47 for the canonicality check. Likewise, first canonicality check circuitry 858A may perform the canonicality check on only bits 63 and 47 and may cause a canonicality error if bits 63 and 47 are not both canonical (e.g., both cleared to zero for user-level virtual addresses).

In a second example, a second 64-bit virtual address 810B is shown. A second circuitry 860B to select bits for a canonicality check is coupled to receive the second 64-bit virtual address 810B. The second circuitry 860B is operative to select bits for the canonicality check according to a second control 858B. In this second example, the second control 858B indicates that 57-bit addressing is to be used. Bits [62:57] represent a metadata field that can store metadata 818B. In some embodiments, for this second control, and when 5-level paging is active, the second circuitry 860B may be controlled to select only bits 63 and 56 for the canonicality check. Likewise, second canonicality check circuitry 848B may perform the canonicality check on only bits 63 and 56 and may cause a canonicality error if bits 63 and 56 are not both canonical (e.g., both cleared to zero for user-level virtual addresses).

In a third example, a third 64-bit virtual address 860C is shown. A third circuitry 860C to select bits for a canonicality check is coupled to receive the third 64-bit virtual address 810C. The third circuitry 860C is operative to select bits for the canonicality check according to a third control 858C. In this third example, the third control 858C indicates that 57-bit addressing is to be used. Bits [62:57] represent a metadata field that can store metadata 818C. In some embodiments, for this third control, and when 4-level paging is active, the third circuitry 860C may be controlled to select only bits 63 and bits [56:47] for the canonicality check. Likewise, third canonicality check circuitry 860C may perform the canonicality check on only bits 63 and bits [56:47] and may cause a canonicality error if bits 63 and bits [56:47] are not all canonical (e.g., all cleared to zero for user-level virtual addresses).

Figure 9:
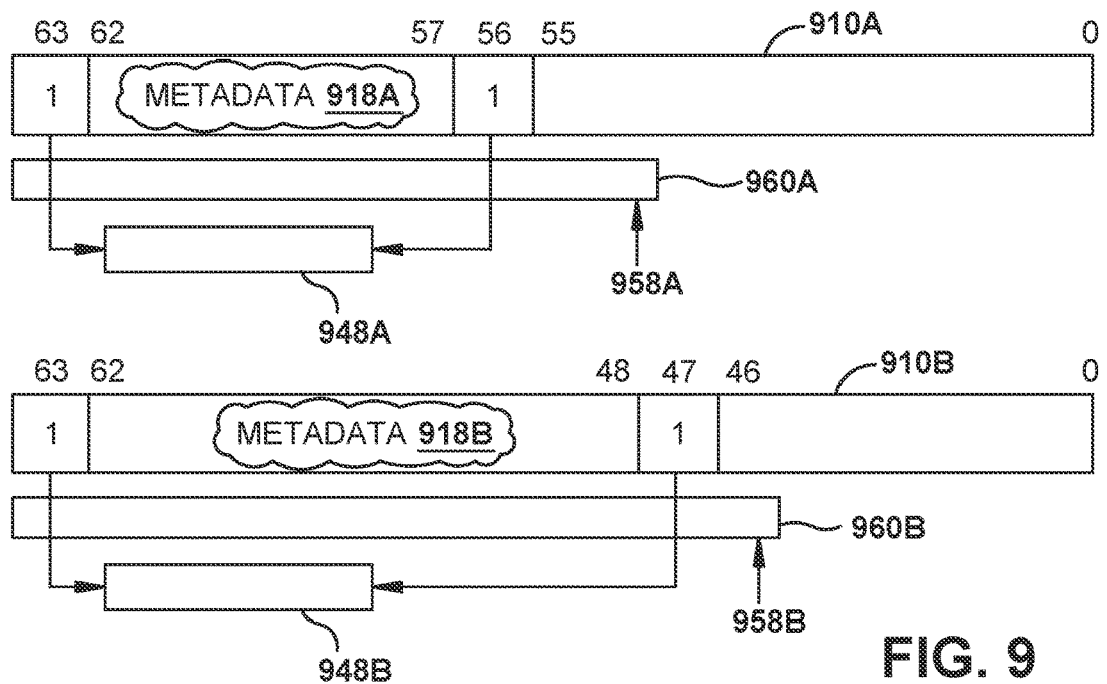
FIG. 9 is a block diagram showing different metadata field widths, and bits used in canonicality checks, for supervisor-level 64-bit virtual addresses, according to some embodiments.

FIG. 9 is a block diagram showing different metadata field widths, and bits selected for and used in canonicality checks, for supervisor-level 64-bit virtual addresses, according to some embodiments. It is to be appreciated that these are only example embodiments, and that other embodiments are not so limited.

In a first example, a first 64-bit virtual address 910A is shown. A first circuitry 960A to select bits for a canonicality check is coupled to receive the first 64-bit virtual address 910A. The first circuitry 960A is operative to select bits for the canonicality check according to a first control 958A. In this first example, the first control 958A indicates that 57-bit addressing is to be used. Bits [62:57] represent a metadata field that can store metadata 918A. In some embodiments, for this first control, and when 5-level paging is active, the first circuitry 960A may be controlled to select only bits 63 and 56 for the canonicality check. Likewise, first canonicality check circuitry 948A may perform the canonicality check on only bits 63 and 56 and may cause a canonicality error if bits 63 and 56 are not both canonical (e.g., both set to one or active for user-level virtual addresses).

In a second example, a second 64-bit virtual address 910B is shown. A second circuitry 960B to select bits for a canonicality check is coupled to receive the second 64-bit virtual address 910B. The second circuitry 960B is operative to select bits for the canonicality check according to a second control 958B. In this second example, the second control 958B indicates that 48-bit addressing is to be used. Bits [62:48] represent a metadata field that can store metadata 918B. In some embodiments, for this second control, and when 4-level paging is active, the second circuitry 960B may be controlled to select only bits 63 and 47 for the canonicality check. That is, the number of metadata bits available in supervisor pointer addresses depends on the paging mode active. Likewise, second canonicality check circuitry 948B may perform the canonicality check on only bits 63 and 47 and may cause a canonicality error if bits 63 and 47 are not both canonical (e.g., both cleared to zero for user-level virtual addresses).

Figure 10:
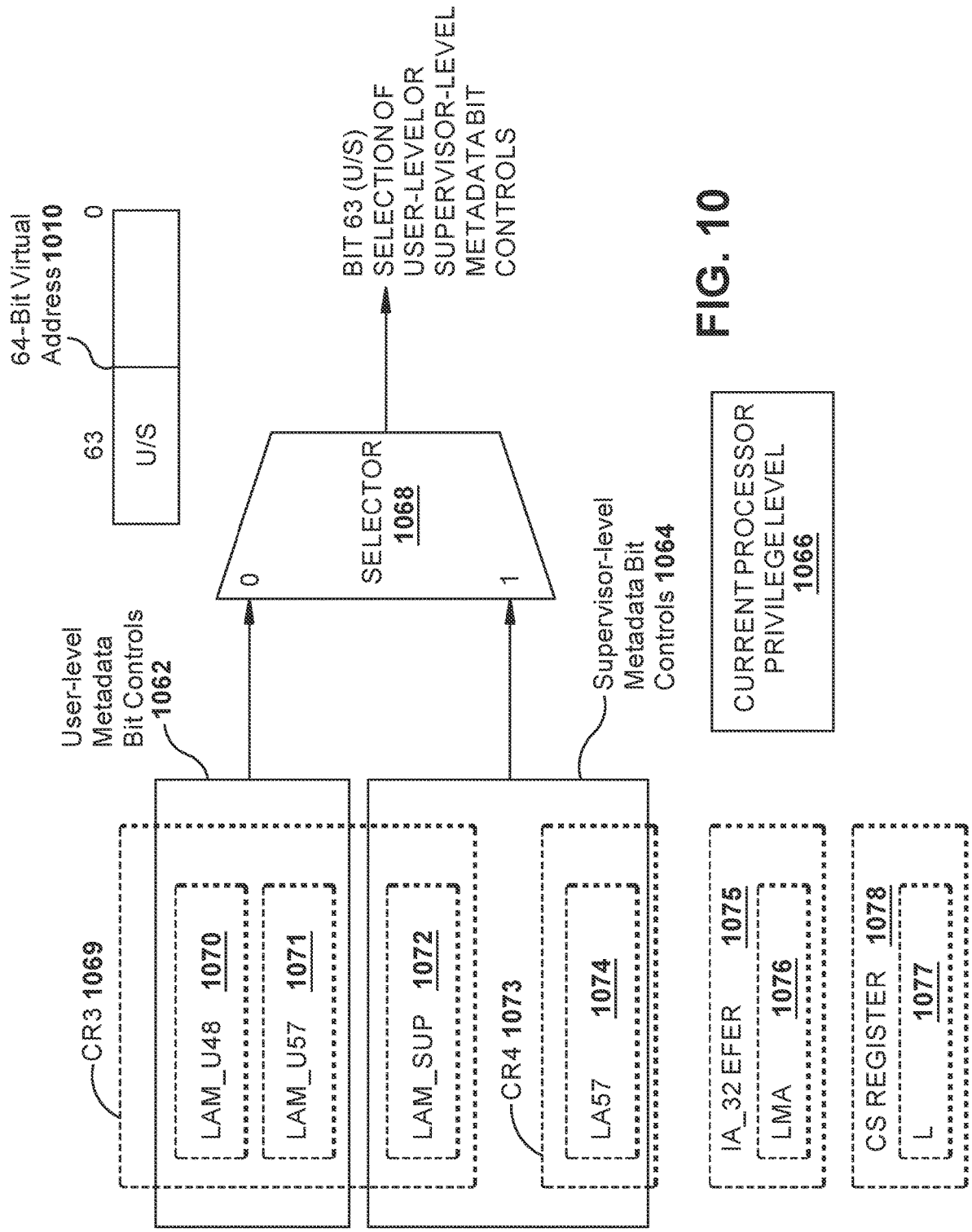
FIG. 10 is a block diagram showing either user-level metadata bit controls or supervisor-level metadata bit controls selected according to a bit 63 of a 64-bit virtual address.

FIG. 10 is a block diagram showing that user-level metadata bit controls 1062 or supervisor-level metadata bit controls 1064 may be selected according to a bit 63 of a 64-bit virtual address 1010. The bit 63 represents a user-level or supervisor-level (U/S) indicator for the 64-bit virtual address. According to one common convention, the bit 63 being cleared to binary 0 may indicate that the 64-bit virtual address is user-level, and the bit 63 being set to binary 1 may indicate that the 64-bit virtual address is supervisor-level.

In some embodiments, there may be both the user-level metadata bit controls 1062 and the supervisor-level metadata bit controls 1064. The user-level metadata bit controls may be provided to control one of a plurality of different possible numbers of metadata bits for 64-bit virtual addresses that are user-level. For example, one or more bits may be provided to select either 48-bit addressing or 57-bit addressing for user-level 64-bit virtual addresses. Similarly, the supervisor-level metadata bit controls may be provided to control one of a plurality of different possible numbers of metadata bits for 64-bit virtual addresses that are supervisor-level. Providing both the user-level and the supervisor-level metadata bit controls may allow controlling different numbers of metadata bits to be used for user-level and supervisor-level virtual addresses, respectively.

In some embodiments, the value of the bit 63 of the 64-bit virtual address may be provided as control to a multiplexer or other selector circuit 1068 to select either the user-level metadata bit controls 1062, or the supervisor-level metadata bit controls 1064, to be applied to the 64-bit virtual address 1010. For example, the bit 63 being cleared to binary 0 may select the user-level metadata bit controls, whereas the bit 63 being set to binary 1 may select the supervisor-level metadata bit controls. In some embodiments, such selection of either the user-level or supervisor-level controls by the bit 63 may be performed irrespective or regardless of a current processor privilege level 1066 representing the privilege level at which the processor is currently operating (e.g., ring level in some architectures, exception level (e.g., exception level 0, exception level 1) in other architectures, etc.).

One potential advantage of this is that it may help to allow a possibility of more than (64−X)-bits of the pointer to be used as metadata bits when the processor is currently operating with X-bits of address bits. For example, when the processor is currently operating with X-bits of address bits (e.g., 57-bits) the user-level metadata bit controls may be configured to use less than the X-bits of address bits (e.g., 48-bits), even though supervisor-level software is still using X-bits. One possible reason for doing this is that it may allow user-level software to use a greater number of metadata bits (e.g., 15 instead of 6).

Another possible approach would be to select the metadata bit controls based on the current processor privilege-level irrespective or regardless of whether the 64-bit virtual address is a user-level 64-bit virtual address or a supervisor-level 64-bit virtual address. However, this has a possible drawback that supervisor software can only perform memory accesses with 64-bit virtual addresses according to the controls for supervisor privilege level, even when the 64-bit virtual addresses are user-level 64-bit virtual addresses. Consider an example where user-level software passes a user-level pointer to supervisor-level software (e.g., a driver in the kernel). When the supervisor-level software performs the memory access with the pointer, if the metadata bit controls are determined based on the current processor privilege level instead of based on bit 63 of the pointer, then the access will be performed based on the supervisor-level metadata bit controls. This has a disadvantage that prior to a supervisor-level software access with user pointers it may need to explicitly sanitize the user-level pointer or perform other complex and/or high overhead approaches as described elsewhere herein. In contrast, if the metadata bit controls were selected instead based on the bit 63 of the pointer as described above, then when the supervisor-level software performs the memory access with the pointer, in the embodiments herein, it will be performed based on and/or according to the user-level metadata bit controls instead of the supervisor-level metadata bit controls, even though the access is being performed by the supervisor-level software. This may help to maintain the user-level software intent to use a given number of metadata bits which may even be different than the number used by the supervisor-level software.

Also shown in FIG. 10 are specific example embodiments of metadata bit controls for an x86 architecture processor according to some embodiments. It is to be appreciated that these specific metadata bit controls are not required for other embodiments. These metadata bit controls are included to implement a Linear Address Masking extension which represents one detailed example embodiment of the hardware metadata handling approaches described herein. An LMA bit 1076 is be included in an IA32_EFER (Extended Feature Enable Register) 1075. The IA32_EFER is a model-specific register (MSR) with number 0xC0000080. Also, an L bit 1077 is included in a code segment (CS) register 1078. The LAM extension is enabled in 64-bit mode for data pointers when the LMA bit 1076 is set to binary one and the L bit 1077 is set to binary one. Support for the LAM extension is be enumerated by a CPUID feature flag bit, namely CPUID.07H.01H.EAX.LAM[bit 26].

Also shown are specific example embodiments of the user-level metadata bit controls 1062, and the supervisor-level metadata bit controls 1064. A CR3 control register 1069 and a CR4 control register 1073 are shown. These are control registers in x86 architecture processors. The example user-level metadata bit controls 1062 include a first or LAM_U57 bit 1070 (e.g., bit 60) and a second or LAM_U48 bit 1071 (e.g., bit 61) in the CR3 control register for user-level pointers (i.e., pointers with address bit 63 cleared to 0). The LAM extension may be active for user-level data pointers when (IA32_EFER.LMA & CS.L & (CR3.LAM_U48|CR3.LAM_U57)) is 1. The LAM_U57 bit when set to binary one configures bits [62:57] as a metadata field. The LAM_U48 bit when set to binary one may configure bits [62:48] as a metadata field. That is, the metadata width is 6 bits if LAM_U57 is 1 and is 15 bit when LAM_U57 is 0. Note that LAM_U57 has priority on LAM_U48 and when both are set the LAM_U57 takes precedence.

In some embodiments, the supervisor-level metadata bit controls 1064 may include a first or LAM_SUP bit 1072 (e.g., bit 62) in the CR3 control register 1069, and a second or supervisor metadata field width (LA57) bit 1074 in the CR4 control register 1073 for supervisor-level pointers (i.e., pointers with address bit 63 set to 1). The metadata approaches described herein may be active for supervisor-level data pointers and use of bits 62:PAGING_LA_WIDTH as metadata bits, when (IA32_EFER.LMA & CS.L & CR3.LAM_SUP) is 1. The metadata field width is 6 bits if CR4.LA57 is 1 and is 15 bits if CR4.LA57 is 0.

Metadata use contract through LAM_U57 and LAM_U48 may help to allow application portability between 57-bit addressing and 48-bit addressing operating systems with less risk of causing compatibility issues (e.g., software developed on 48-bit OS using unapproved metadata that only gets detected on 57-bit OS). Also, explicit user contract on metadata width using LAM_U57 and LAM_U48 control may help to preserve a path to a future 64-bit addressing based OS. Such OS may still honor the LAM_U57 and LAM_U48 contract of legacy applications without needing to alias map large parts of the user address space used for metadata.

For data accesses, when embodiments disclosed herein are enabled, this effectively allows masking of certain bits of the address that are input to the CPU and paging canonicality checking. When LAM is active for user data pointers and bits that are usually address bits are masked then the address bits are extended before they are subject to paging canonicality and translations. Example behavior according to an embodiment is shown in Tables 1-2.

TABLE 1

Controls, metadata bits, and treatment of canonicality checks for user pointers

| Row | Bit 63 | OS VA | Control Bit U57 | Control Bit U48 | M.D. Field Width | M.D. Field Bits | Paging Canonicality Check | Bits Extended for Paging Input |
|---|---|---|---|---|---|---|---|---|
| 1 | 0 | 48 | 0 | 1 | 15 | [62:48] | Effectively checks 63 = 47 | 47 to 62:48 |
| 2 | 0 | 48 | 1 | * | 6 | [62:57] | Effectively checks 63 = 56:47. Extended [56:48] translated by paging | 56 to 62:57 |
| 3 | 0 | 57 | 0 | 1 | 15 | [62:48] | Effectively checks 63 = 47 | 47 to 62:48 |
| 4 | 0 | 57 | 1 | * | 6 | [62:57] | Effectively checks 63 = 56 | 56 to 62:57 |

TABLE 2

Controls, metadata bits, and treatment of canonicality checks for supervisor pointers

| Row | Bit 63 | OS VA | Control Bit S_SUP | Control Bit S | M.D. Field Width | M.D. Field Bits | Paging Canonicality Check | Bits Extended for Paging Input |
|---|---|---|---|---|---|---|---|---|
| 1 | 1 | 48 | 1 | 0 | 15 | [62:48] | Effectively checks 63 = 47 | 47 to 62:48 |
| 2 | 1 | 57 | 1 | 1 | 6 | [62:57] | Effectively checks 63 = 56 | 56 to 62:57 |

Further details of the specific example embodiment of the LAM extension, as well as other possible interactions or interrelations with other extensions or optional extension in x86 processors, are discussed further below. It is to be appreciated that other embodiments may instead be implemented in non-x86 processors and therefore these specific details need not apply. Also, other implements of x86 processors may implement the interactions or details differently. Further, some of these extensions are optional in x86 processors and thus these details need not necessarily be implemented. Thus, the following details are to be regarded as example details according to one specific example x86 implementation embodiment.

LAM may be supported in 64-bit mode and may be applicable to addresses used for data accesses, but not virtual addresses used for code fetches or addresses that specify that target of jump, call, and other control transfer instructions.

The following are optional implementation details for an example x86 implementation regarding canonicality checking for data addresses written to control registers and MSRs. Processors that support LAM continue to have the address written to virtual address registers (e.g., control registers, MSRs, GDTR, LTTR, etc.) be 57-bit canonical (if the processor supports 5-level paging) or be 48-bit canonical (if the processor only supports 4-level paging) and LAM masking is not performed on these writes. These virtual addresses may still be enforced to be CPU canonical. When such addresses are later used for performing a data access, the processor performs canonicality checking based on paging mode active and LAM mode active at the time of access. Examples of such registers in the x86 architecture include at least IA32_RTIT_ADDR0/1_A/B (Code); IA32_CSTAR (Code); IA32_LSTAR (Code); IA32_SYSENTER_EIP (Code); IA32_UINT_HANDLER (Code); IA32_LBR_x_TO/FROM (Code); IA32_PL0/1/2/3_SSP (Data); IA32_INT_SSP_TABLE (Data); IA32_U/S_CET (Data); IA32_DS_AREA (Data); IA32_SYSENTER_ESP (Data); IA32_UINT_PD (Data); IA32_BIOS_UPDT_TRIG (Data); IA32_UINT_TT (Data); IA32_FS_BASE (Data); IA32_GS_BASE (Data); IA32_KENEL_GS_BASE (Data); CR2 (Code or Data); DRx (Code or Data); IDTR (Data); GDTR (Data); LDTR (Data); TR (Data); and SSP (Data).

The following are optional implementation details for an example x86 implementation regarding paging interactions. If 4-level paging and LAM_U48/LAM_U57/LAM_SUP is active, the processor uses bits 47:12 of the linear address for address translation. If 5-level paging and LAM_U_48 is active, the processor sign extends bit 47 of the linear address to bits 56:48 and uses the sign extended linear address bits 56:12 for address translation. If 5-level paging and LAM_U_57 or LAM_SUP is active, the processor uses linear address bits 56:12 for address translation. Page faults report the faulting linear address in CR2. The processor does not report the masked metadata of the faulting linear address used for paging in CR2 in 64-bit mode. If 4-level paging is active, then the processor reports the faulting linear address used for address translation with bit 47 sign extended to bits 63:48. If 5-level paging is active, the processor reports the faulting linear address used for address translation with bit 56 sign extended to bits 63:57. The INVLPG instruction is used to invalidate any translation lookaside buffer (TLB) entries for a memory address specified with the source operand. The processor does not do linear address masking on the specified memory address. Thus, in 64-bit mode, if the memory address specified is in non-canonical form then the INVLPG is the same as a NOP. The INVPCID instruction invalidates mappings in the TLB and paging structure caches based on the processor context identifier (PCID). The INVPCID descriptor provides the memory address to invalidate when the descriptor is of type 0 (individual-address invalidation). The processor does not do any linear address masking of the specified memory address, and in 64-bit mode if this memory address is in non-canonical form then the processor generates a #GP(0) exception.

The following are optional implementation details for an example x86 implementation regarding Intel Virtual Machine Extensions (VMX) interactions. Regarding guest linear address (Intel example term for virtual address), certain virtual machine (VM) exits save the guest linear address of the attempted instruction in the virtual machine control structure (VMCS). The processor does not report the masked metadata in the VMCS. If 4-level paging and LAM_U48/LAM_U57/LAM_SUP is active, then the processor reports the guest linear address with bit 47 sign extended to bits 63:48. If 5-level paging and LAM_U_48 is active, the processor reports the guest linear address with bit 47 sign extended to bits 63:48. If 5-level paging and LAM_U_57/LAM_SUP is active then the processor reports the guest linear address with bit 56 sign extended to bits 63:57. With regard to guest CR3, host CR3, and CR3 target list, processors that supports LAM allow bits 62:60 of CR3 to be set to 1 in the VMCS. When in VMX non-root operation, if CR3 target list execution controls are active, then bits 62:60 of the CR3 are ignored for CR3 target list matching. Regarding Hypervisor-managed Linear Address Translation (HLAT), HLAT is active when the "enable HLAT" tertiary processor based VM-execution control is 1. When HLAT is enabled, the processor translates a guest linear address using HLAT paging structures if the guest linear address matches the Protected Linear Range. LAM enables are obtained from bits 62:60 of the guest CR3 irrespective of whether HLAT paging structures or guest CR3 root paging structures are used for address translation.

The following are optional implementation details for an example x86 implementation regarding debug and tracing interactions. Regarding debug registers, the debug registers DR0-DR3 continue to have the linear address written to be within the linear-address limit of the processor implementation as a precondition to enabling breakpoints. If 4-level paging and LAM_U48/LAM_U57/LAM_SUP is active, the processor uses the linear address with bit 47 sign extended to bits 63:48 to perform address matching. If 5-level paging and LAM_U_48 is active, the processor uses the linear address with bit 47 sign extended to bits 63:48 to perform address matching. If 5-level paging and LAM_U_57 or LAM_SUP is active, the processor uses the linear address with bit 56 sign extended to bits 63:57 to perform address matching. Regarding Intel® Processor Trace, it supports a CR3-filtering mechanism by which generation of packets containing architectural states can be enabled or disabled based on the value of CR3 matching the contents of the IA32_RTIT_CR3_MATCH MSR. On processors that support LAM, bits 62:60 of the CR3 should also match bits 62:60 of this MSR to enable tracing.

The following are optional implementation details for an example x86 implementation regarding Intel® Software Guard Extensions (SGX) interactions. Memory operands of ENCLS, ENCLU, and ENCLV that are data pointers follow the LAM architecture and mask suitably. Code pointers continue to not mask metadata bits. ECREATE does not mask BASEADDR specified in SECS, and the unmasked BASEADDR must be canonical. Two new SECS attribute bits are defined for LAM support in enclave mode: (1) ATTRIBUTE.LAM_U48 (bit 9)—Activate LAM for user data pointers and use of bits 62:48 as masked metadata in enclave mode. This bit can be set if CPUID.12H.01H.EAX [9] is 1. (2) ATTRIBUTE.LAM_U57 (bit 8)—Activate LAM for user data pointers and use of bits 62:57 as masked metadata in enclave mode. This bit can be set if CPUID.12H.01H.EAX[8] is 1. ECREATE causes #GP(0) if ATTRIBUTE.LAM_U48 bit is 1 and CPUID.12H.01H.EAX[9] is 0, or if ATTRIBUTE.LAM_U57 bit is 1 and CPUID.12H.01H.EAX[8] is 0. If SECS.ATTRIBUTES.LAM_U57 is 1, then LAM_U57 is active in enclave mode. If SECS.ATTRIBUTES.LAM_U57 is 0 and SECS.ATTRIBUTES.LAM_U48 is 1, then LAM_U48 is active in enclave mode. When in enclave mode, supervisor data pointers are not subject to any masking. The following instructions check for linear addresses to be within the ELRANGE. the check against ELRANGE is done post any metadata masking as applicable, i.e., on the paging linear address, EACCEPT, EACCEPTCOPY, EGETKEY, EMODPE, EREPORT. The following linear address fields in the Intel SGX data structures hold linear addresses that are either loaded into the EPCM or are written out from the EPCM and do not contain any metadata, SECS.BASEADDR, and PAGEINFO.LINADDR.

The following are optional implementation details for an example x86 implementation regarding SYSTEM MANAGEMENT MODE (SMM) interactions. RSM allows restoring a CR3 value with bits 62:60 having non-zero values on processors that support LAM.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 11A, 11B:
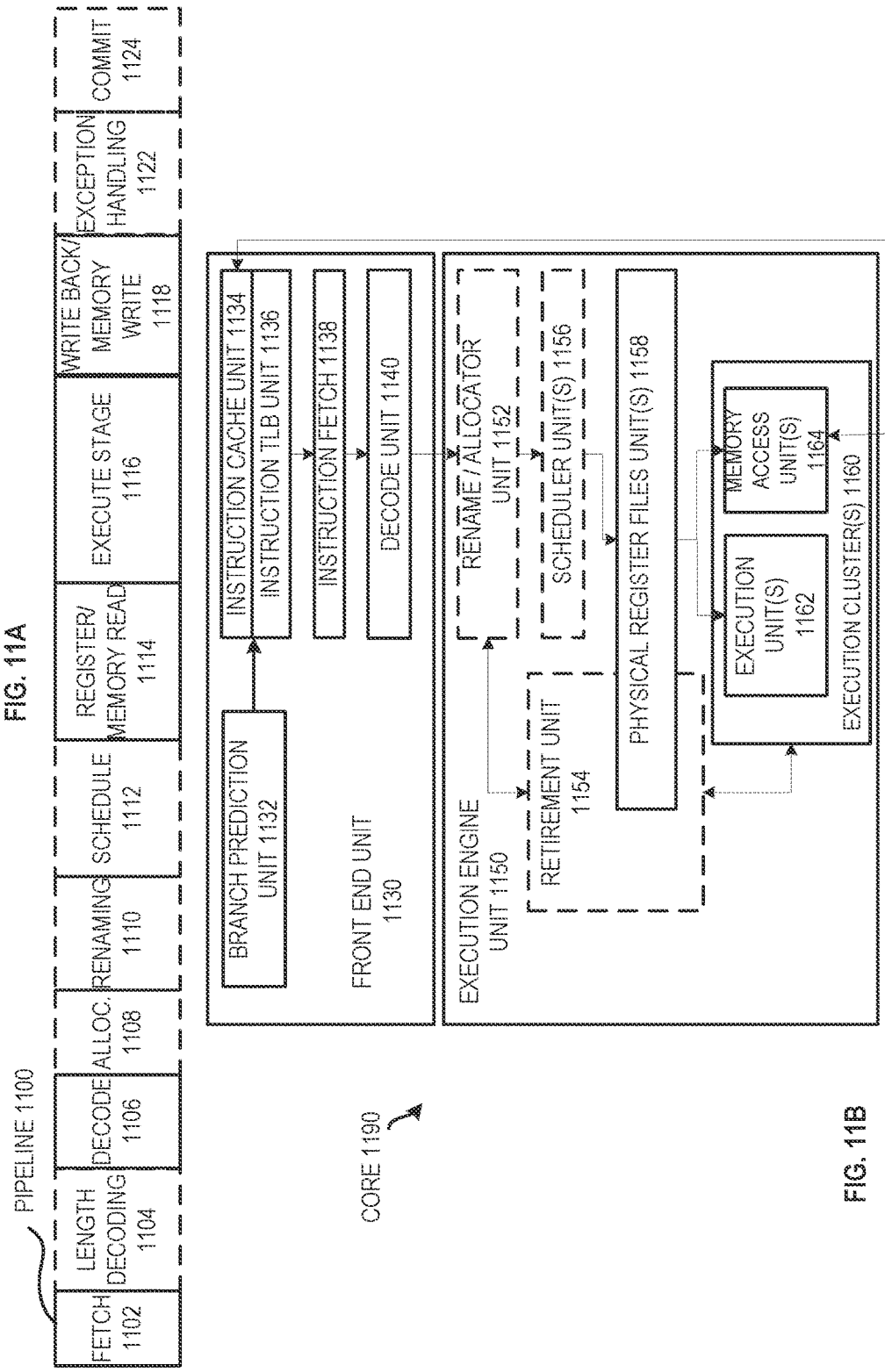
FIG. 11A is a block diagram illustrating an embodiment of an in-order pipeline and an embodiment of a register renaming out-of-order issue/execution pipeline.
FIG. 11B is a block diagram of an embodiment of processor core including a front end unit coupled to an execution engine unit and both coupled to a memory unit.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
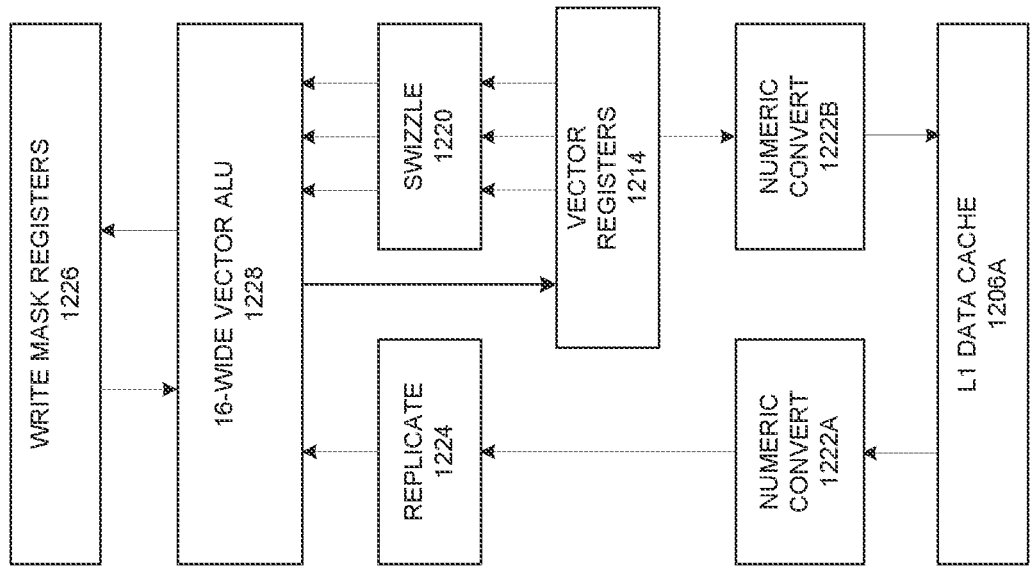
FIG. 12B is a block diagram of an embodiment of an expanded view of part of the processor core of FIG. 12A.
Figure 12A:
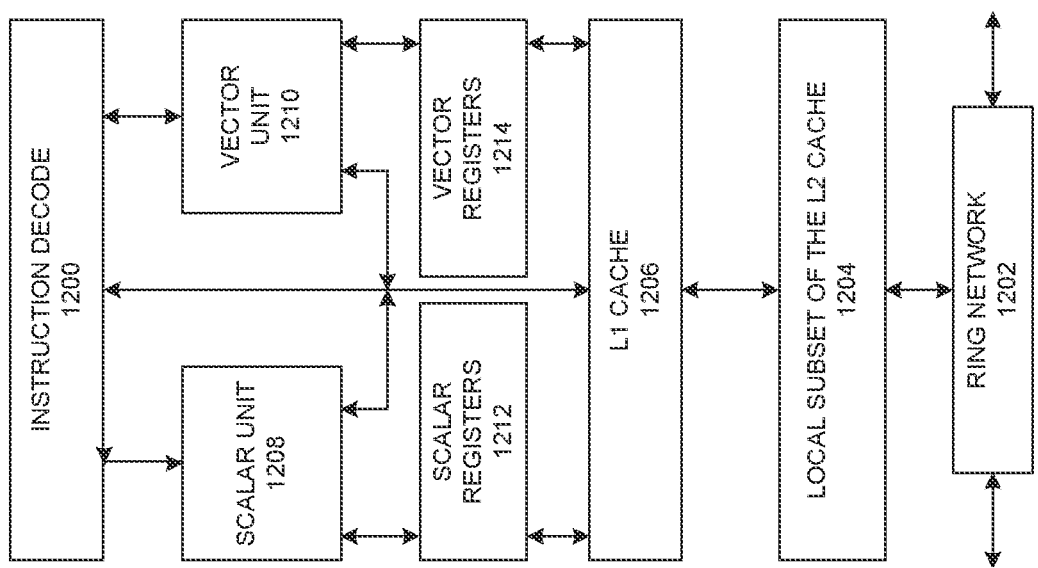
FIG. 12A is a block diagram of an embodiment of a single processor core, along with its connection to the on-die interconnect network, and with its local subset of the Level 2 (L2) cache.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Processor with Integrated Memory Controller and Graphics

Figure 13:
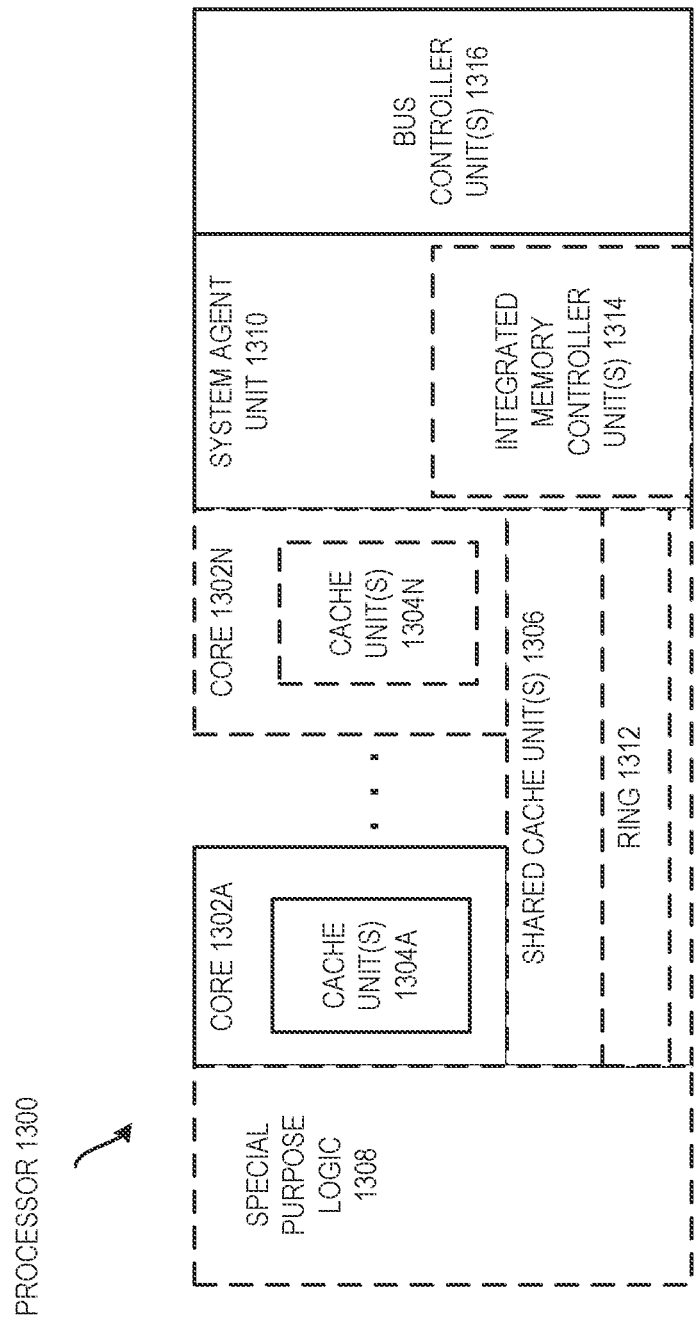
FIG. 13 is a block diagram of an embodiment of a processor that may have more than one core, may have an integrated memory controller, and may have integrated graphics.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
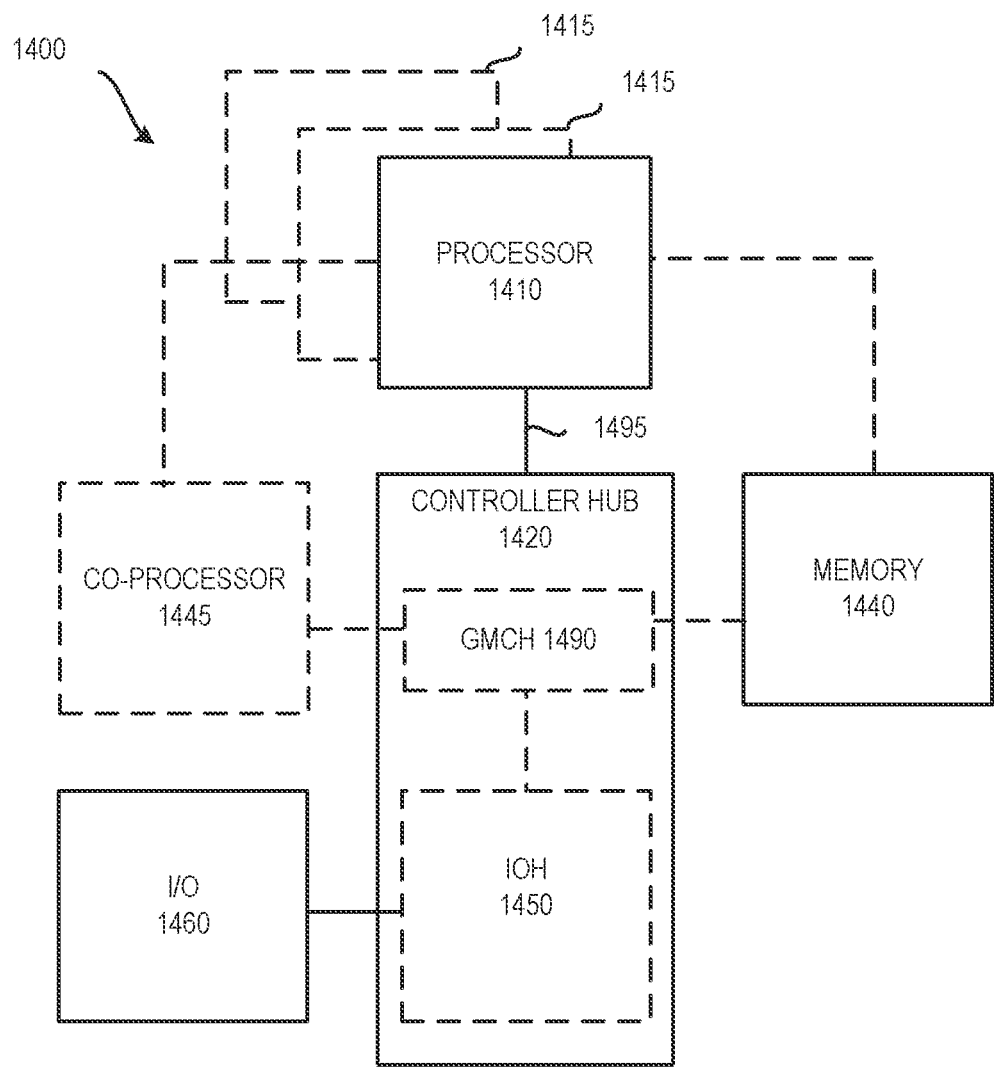
FIG. 14 is a block diagram of a first embodiment of a computer architecture.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor (s) 1445 accept and execute the received coprocessor instructions.

Figure 15:
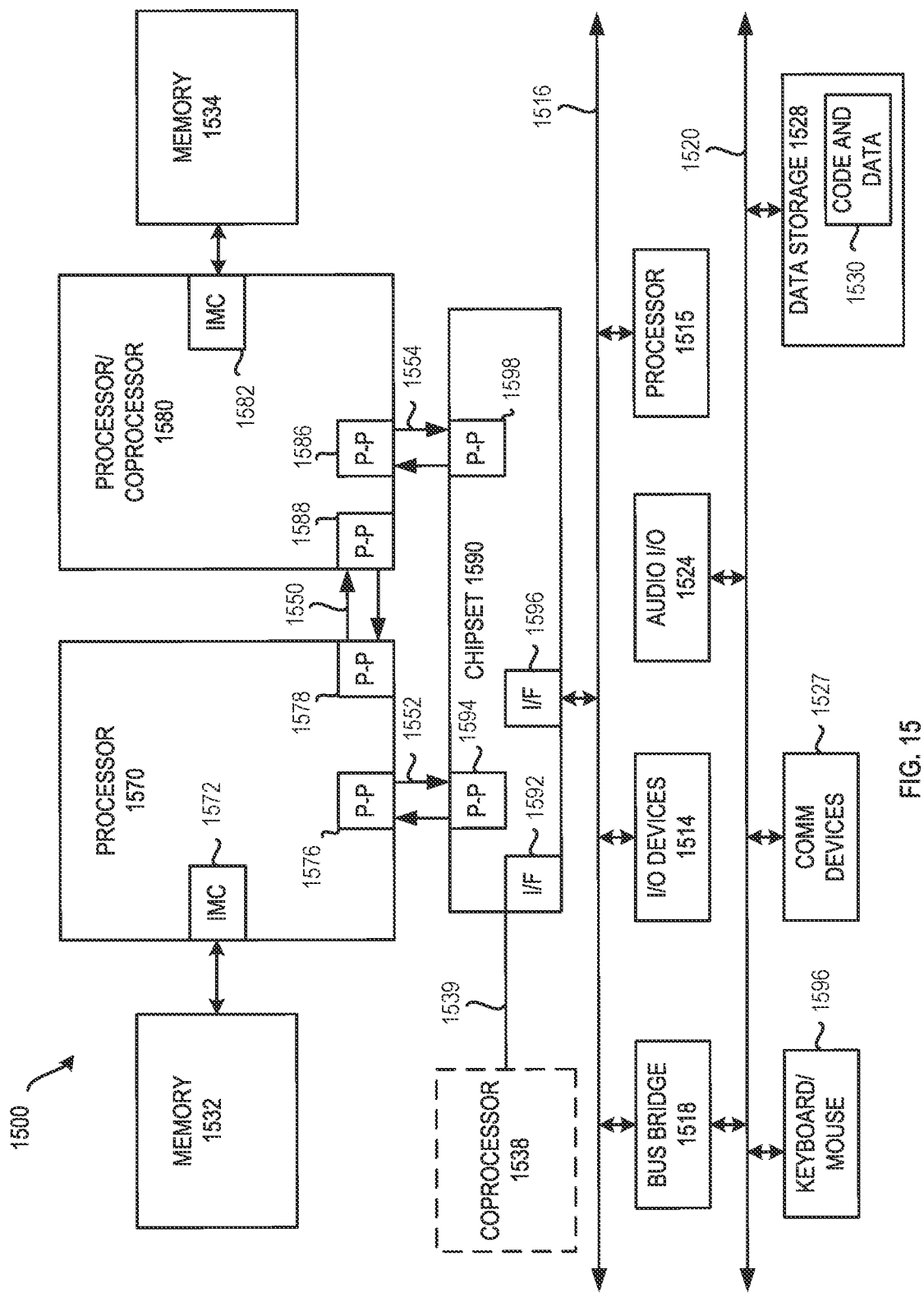
FIG. 15 is a block diagram of a second embodiment of a computer architecture.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
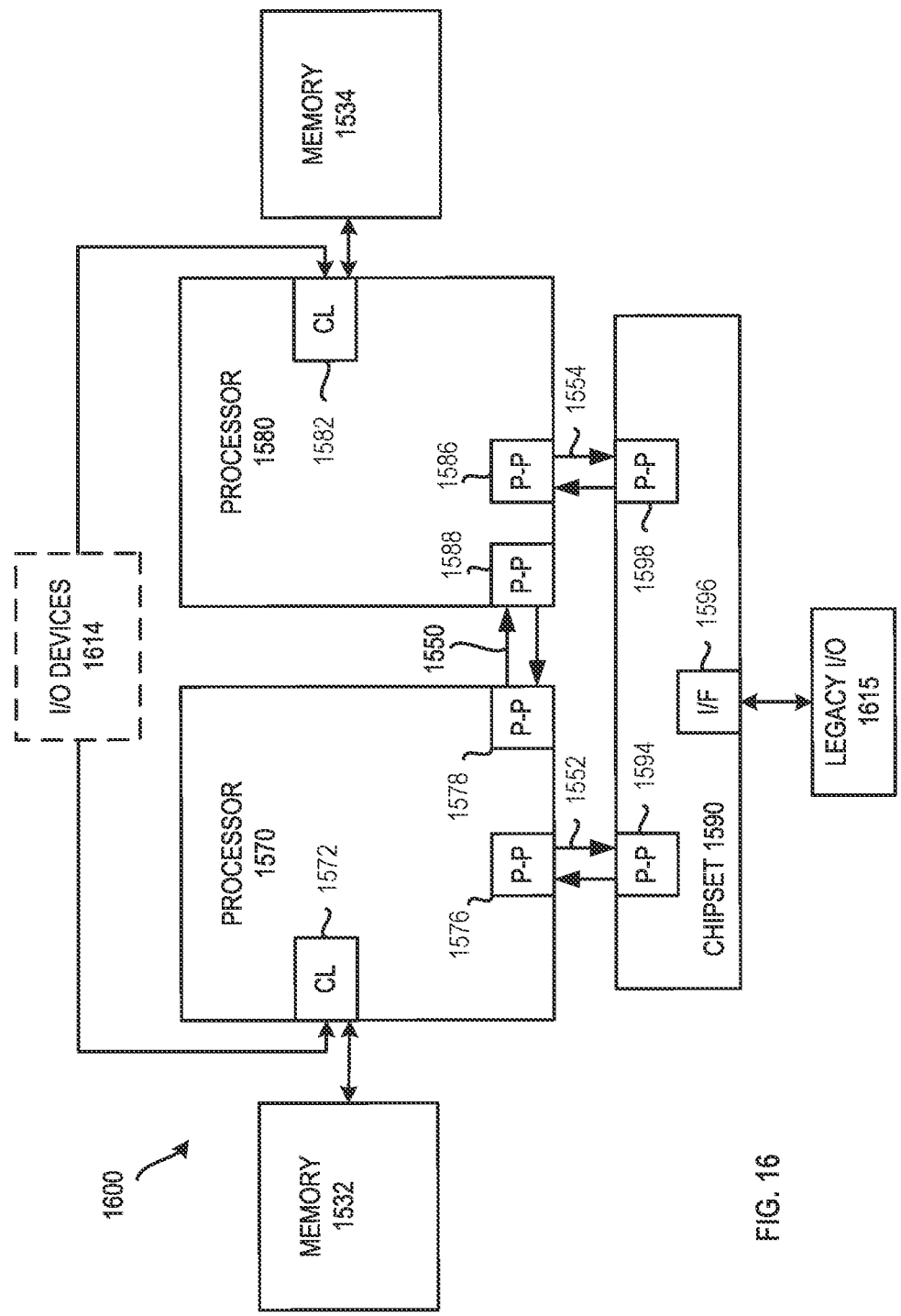
FIG. 16 is a block diagram of a third embodiment of a computer architecture.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
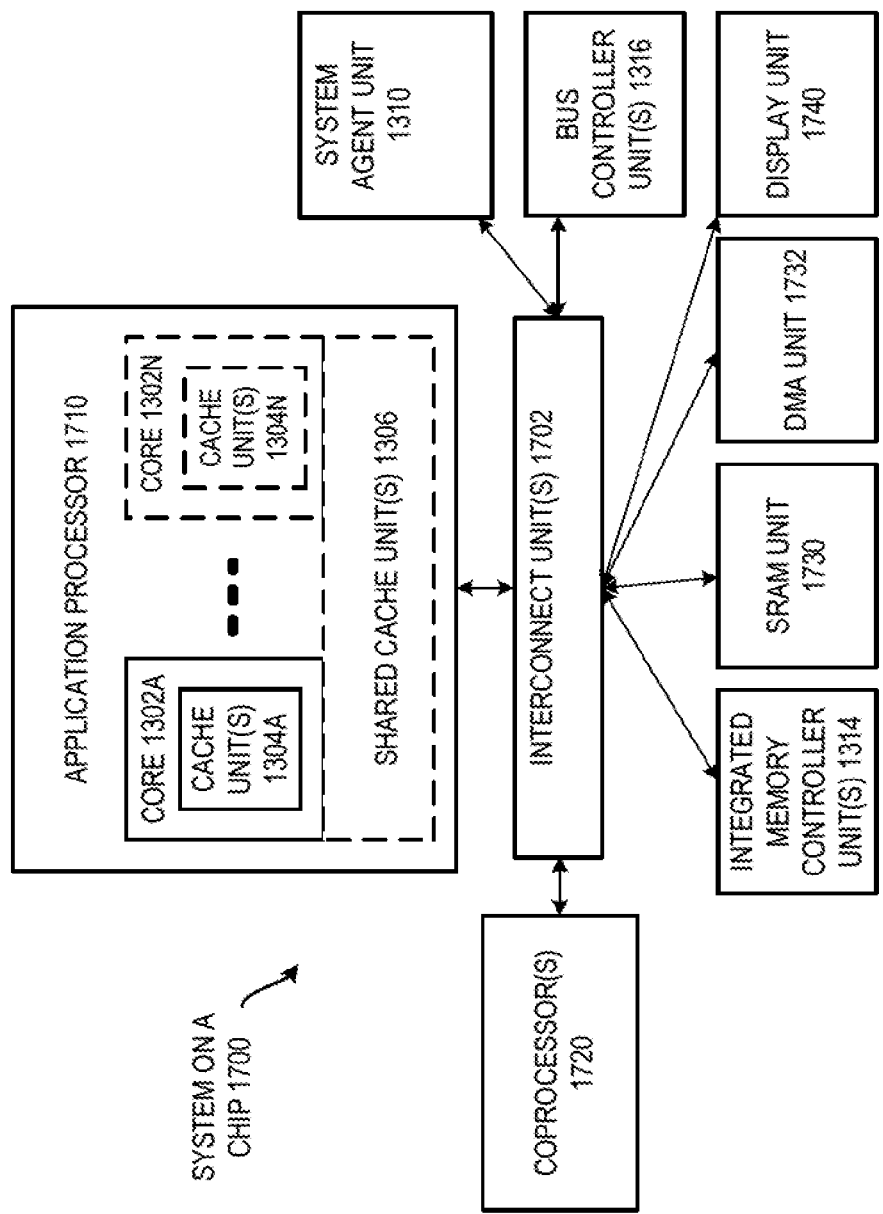
FIG. 17 is a block diagram of an embodiment of a system-on-a-chip architecture.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
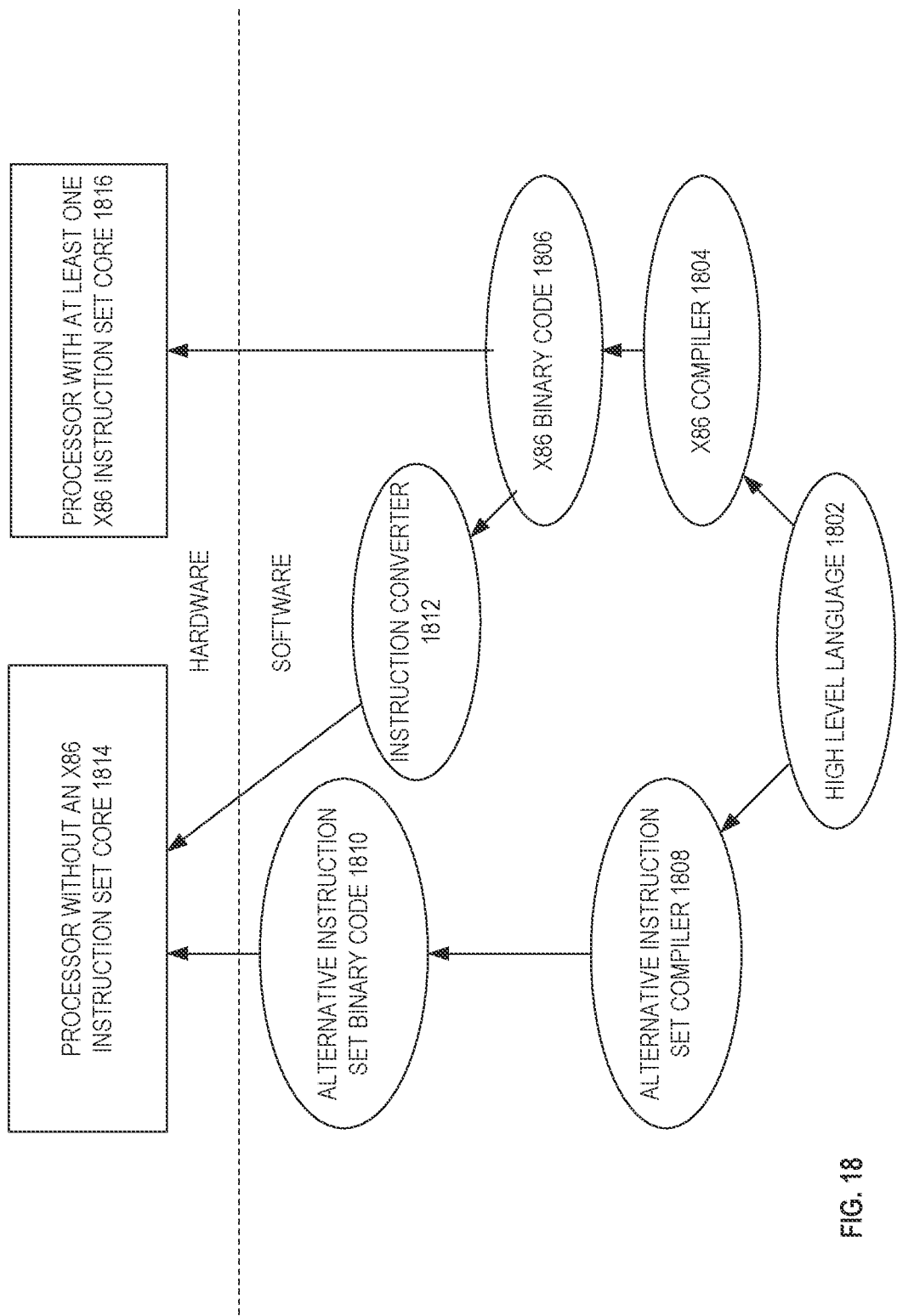
FIG. 18 is a block diagram of use of a software instruction converter to convert binary instructions in a source instruction set to binary instructions in a target instruction set, according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA).

The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Components, features, and details described for any of FIGS. 2A/2B and 5-10 may also optionally apply to any of FIGS. 3-4. Components, features, and details described for any of the processors disclosed herein (e.g., processor 320) may optionally apply to any of the methods disclosed herein (e.g., method 436), which in embodiments may optionally be performed by and/or with such processors. The processors disclosed herein may have various microarchitectures disclosed herein (e.g., FIG. 11B). Any of the processors described herein (e.g., processor 320) in embodiments may optionally be included in any of the systems disclosed herein (e.g., any of the systems of FIGS. 13-17).

Processor components disclosed herein may be said and/or claimed to be operative, operable, capable, able, configured adapted, or otherwise to perform an operation. For example, a decode circuitry may be said and/or claimed to decode an instruction, an execution circuitry may be said and/or claimed to store a result, or the like. As used herein, these expressions refer to the characteristics, properties, or attributes of the components when in a powered-off state, and do not imply that the components or the device or apparatus in which they are included is currently powered on or operating. For clarity, it is to be understood that the processors and apparatus claimed herein are not claimed as being powered on or running.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, yet still co-operate or interact with each other. For example, an execution circuit may be coupled with a decode circuit through one or more intervening components (e.g., register rename, allocate, and schedule circuitry). In the figures, arrows are used to show connections and couplings.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

In the description above, specific details have been set forth to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical, or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers. References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Example Embodiments

The following examples pertain to further embodiments. Specifics in the examples may be used anywhere in one or more embodiments.

Example 1 is a processor including a decode circuit to decode a memory access instruction. The memory access instruction is to indicate one or more memory address operands. The one or more memory address operands are to have address generation information and metadata. The processor also includes an execution circuit coupled with the decode circuit, the execution circuit to generate a 64-bit virtual address based on the one or more memory address operands. The 64-bit virtual address has a bit 63, an X-bit address field starting at a bit 0 to store an address generated from the address generation information, and one or more metadata bits to store the metadata. The execution circuit is also to perform a canonicality check on the 64-bit virtual address that does not fail due to non-canonical values of the metadata stored in the one or more metadata bits.

Example 2 includes the processor of Example 1, in which the one or more metadata bits optionally include a metadata field from a bit 62 to a bit X of the 64-bit virtual address.

Example 3 includes the processor of any one of Examples 1 and 2, in which the execution circuit is optionally to generate the 64-bit virtual address having more than eight metadata bits.

Example 4 includes the processor of any one of Examples 1 to 3, further including one or more optional registers to store one or more control bits to control one of a plurality of different possible numbers of the one or more metadata bits.

Example 5 includes the processor of Example 4, in which the plurality of different possible numbers of the one or more metadata bits optionally include six metadata bits and fifteen metadata bits.

Example 6 includes the processor of any one of Examples 1 to 5, in which the execution circuit to perform the canonicality check is to check at least the bit 63 and a bit (X−1) for canonicality but is not to check the one or more metadata bits for canonicality.

Example 7 includes the processor of any one of Examples 1 to 6, in which the execution circuit is optionally not to check any of bits [62:X] for canonicality.

Example 8 includes the processor of any one of Examples 1 to 7, in which the execution circuit is optionally to make the one or more metadata bits canonical prior to the performance of the canonicality check and subsequent address translation.

Example 9 includes the processor of any one of Examples 1 to 8, further including one or more registers to store a user-level metadata bits control to control a number of the one or more metadata bits when the bit 63 is zero irrespective of a current processor privilege level.

Example 10 includes the processor of any one of Examples 1 to 9, further including one or more registers to store user-level metadata bits control to control a number of the one or more metadata bits for a user-level, and optionally in which the number of the one or more metadata bits for the user-level is allowed to be more than (64−X)-bits, even when the processor is currently configured to use an X-bit address width.

Example 11 includes the processor of any one of Examples 1 to 10, further including one or more registers to store user-level metadata bits control to control a number of the one or more metadata bits for a user-level, and optionally in which the number of the one or more metadata bits for the user-level is allowed to be more than 6-bits, even when the processor is currently configured to use a 57-bit address width.

Example 12 includes the processor of any one of Examples 1 to 11, in which the execution circuit includes address generation circuitry to generate the 64-bit virtual address, circuitry to prevent the canonicality check from failing due to the non-canonical values of the metadata stored in the one or more metadata bits, and canonicality check circuitry to perform the canonicality check on the 64-bit virtual address.

Example 13 is a method performed by a processor. The method includes decoding a memory access instruction. The memory access instruction indicates one or more memory address operands. The one or more memory address operands have address generation information and metadata. The method also includes generating a 64-bit virtual address based on the one or more memory address operands. The 64-bit virtual address has a bit 63, an X-bit address field starting at a bit 0 storing an address generated from the address generation information, and one or more metadata bits storing the metadata. The method also includes performing a canonicality check on the 64-bit virtual address that does not fail due to non-canonical values of the metadata stored in the one or more metadata bits.

Example 14 includes the method of Example 13, in which the one or more metadata bits include a metadata field from a bit 62 to a bit X of the 64-bit virtual address.

Example 15 includes the method of any one of Examples 13 to 14, in which the one or more metadata bits includes either one of 6 bits or 15 bits.

Example 16 includes the method of any one of Examples 13 to 15, in which to perform the canonicality check includes to check at least the bit 63 and a bit (X−1) for canonicality, but not to check the one or more metadata bits for canonicality.

Example 17 includes the method of any one of Examples 13 to 16, in which to perform the canonicality check includes to check at least the bit 63 and a bit (X−1) for canonicality but not to check any of bits [62:X] for canonicality.

Example 18 includes the method of any one of Examples 13 to 17, further including accessing a user-level metadata bits control to determine a number of the one or more metadata bits when the bit 63 is zero irrespective of a current processor privilege level.

Example 19 includes the method of any one of Examples 13 to 18, further including accessing user-level metadata bits control to determine a number of the one or more metadata bits for a user-level, and optionally in which the number of the one or more metadata bits for the user-level is allowed to be more than (64–X)-bits, even when the processor is currently configured to use an X-bit address width.

Example 20 is a system to process instructions including an interconnect, and a processor coupled with the interconnect. The processor is to receive a memory access instruction. The memory access instruction is to indicate one or more memory address operands. The one or more memory address operands are to have address generation information and metadata. The processor to perform the memory access instruction to generate a 64-bit virtual address based on the one or more memory address operands. The 64-bit virtual address having a bit 63, an X-bit address field starting at a bit 0 to store an address generated from the address generation information, and one or more metadata bits to store the metadata. The processor is to perform a canonicality check on the 64-bit virtual address that does not fail due to non-canonical values of the metadata stored in the one or more metadata bits. The system also includes a dynamic random access memory (DRAM) coupled with the interconnect.

Example 21 includes the system of Example 21, further including one or more registers to store a user-level metadata bits control to control a number of the one or more metadata bits when the bit 63 is zero irrespective of a current processor privilege level.

Example 22 includes the system of any one of Examples 21 to 22, in which the execution circuit to perform the canonicality check is to check at least the bit 63 and a bit (X−1) for canonicality but is not to check the one or more metadata bits for canonicality.

Example 23 includes the system of any one of Examples 21 to 22, in which the one or more metadata bits include a metadata field from a bit 62 to a bit X of the 64-bit virtual address.

Example 24 includes the system of any one of Examples 21 to 23, further including one or more registers to store user-level metadata bits control to control a number of the one or more metadata bits for a user-level, and optionally in which the number of the one or more metadata bits for the user-level is allowed to be more than (64–X)-bits, even when the processor is currently configured to use an X-bit address width.

Example 25 is a processor or other apparatus operative to perform the method of any one of Examples 13 to 19.

Example 26 is a processor or other apparatus that includes means for performing the method of any one of Examples 13 to 19.

Example 27 is a processor or other apparatus that includes any combination of modules and/or units and/or logic and/or circuitry and/or means operative to perform the method of any one of Examples 13 to 19.

What is claimed is:

1. A processor comprising:
    a decode circuit to decode a memory access instruction, the memory access instruction to indicate one or more memory address operands, the one or more memory address operands to have address generation information and metadata; and
    an execution circuit coupled with the decode circuit, the execution circuit to:
        generate a 64-bit virtual address based on the one or more memory address operands, the 64-bit virtual address having a bit 63 to indicate whether the 64-bit virtual address corresponds to user level or supervisor level, an X-bit address field starting at a bit 0 to store an address generated from the address generation information, and one or more metadata bits to store the metadata; and
        perform a canonicality check on the 64-bit virtual address that does not fail due to non-canonical values of the metadata stored in the one or more metadata bits.

2. The processor of claim 1, wherein the one or more metadata bits comprise a metadata field from a bit 62 to a bit X of the 64-bit virtual address.

3. The processor of claim 1, wherein the execution circuit is to generate the 64-bit virtual address having more than eight metadata bits.

4. The processor of claim 1, further comprising one or more registers to store one or more control bits to control one of a plurality of different possible numbers of the one or more metadata bits.

5. The processor of claim 4, wherein the plurality of different possible numbers of the one or more metadata bits include six metadata bits and fifteen metadata bits.

6. The processor of claim 1, wherein the execution circuit to perform the canonicality check is to check at least the bit 63 and a bit (X-1) for canonicality but is not to check the one or more metadata bits for canonicality.

7. The processor of claim 1, wherein the execution circuit is not to check any of bits [62:X] for canonicality.

8. The processor of claim 1, wherein the execution circuit is to make the one or more metadata bits canonical prior to the performance of the canonicality check and subsequent address translation.

9. The processor of claim 1, further comprising one or more registers to store a user-level metadata bits control to control a number of the one or more metadata bits when the bit 63 is zero irrespective of a current processor privilege level.

10. The processor of claim 1, further comprising one or more registers to store user-level metadata bits control to control a number of the one or more metadata bits for the user-level, wherein the number of the one or more metadata bits for the user-level is allowed to be more than (64-X)-bits, even when the processor is currently configured to use an X-bit address width.

11. The processor of claim 1, further comprising one or more registers to store user-level metadata bits control to control a number of the one or more metadata bits for the user-level, wherein the number of the one or more metadata bits for the user-level is allowed to be more than 6-bits, even when the processor is currently configured to use a 57-bit address width.

12. The processor of claim 1, wherein the execution circuit comprises:
    address generation circuitry to generate the 64-bit virtual address;
    circuitry to prevent the canonicality check from failing due to the non-canonical values of the metadata stored in the one or more metadata bits; and
    canonicality check circuitry to perform the canonicality check on the 64-bit virtual address.

13. A method performed by a processor, the method comprising:

decoding a memory access instruction, the memory access instruction indicating one or more memory address operands, the one or more memory address operands having address generation information and metadata;

generating a 64-bit virtual address based on the one or more memory address operands, the 64-bit virtual address having a bit 63 to indicate whether the 64-bit virtual address corresponds to user level or supervisor level, an X-bit address field starting at a bit 0 storing an address generated from the address generation information, and one or more metadata bits storing the metadata; and performing a canonicality check on the 64-bit virtual address that does not fail due to non-canonical values of the metadata stored in the one or more metadata bits.

14. The method of claim 13, wherein the one or more metadata bits comprise a metadata field from a bit 62 to a bit X of the 64-bit virtual address.

15. The method of claim 13, wherein the one or more metadata bits comprises either one of 6 bits or 15 bits.

16. The method of claim 13, wherein to perform the canonicality check includes to check at least the bit 63 and a bit (X-1) for canonicality, but not to check the one or more metadata bits for canonicality.

17. The method of claim 13, wherein to perform the canonicality check includes to check at least the bit 63 and a bit (X-1) for canonicality but not to check any of bits [62:X] for canonicality.

18. The method of claim 13, further comprising accessing a user-level metadata bits control to determine a number of the one or more metadata bits when the bit 63 is zero irrespective of a current processor privilege level.

19. The method of claim 13, further comprising accessing user-level metadata bits control to determine a number of the one or more metadata bits for the user-level, wherein the number of the one or more metadata bits for the user-level is allowed to be more than (64-X)-bits, even when the processor is currently configured to use an X-bit address width.

20. A processor comprising:
a model specific register (MSR) having a bit position to store a first bit value;
a code segment (CS) register having a bit position to store a second bit value; and
circuitry to perform a canonicality check on a virtual address having bit positions 56:0 to store an address, wherein, if the first bit value and the second bit value are set to binary one, a third bit value is set to binary one, and the virtual address is used for a data access, the canonicality check on the virtual address will not fail due to bits stored in bit positions 62:57 of the virtual address being non-canonical.

21. The processor of claim 20, wherein the bits stored in the bit positions 62:57 are to be omitted from the canonicality check.

22. The processor of claim 20, wherein the circuitry to perform the canonicality check on the virtual address is to check at least bits 56:48 for canonicality when 4-level paging is active.

23. The processor of claim 20, wherein the MSR is an Extended Feature Enable Register (EFER).

24. The processor of claim 20, wherein the MSR is an Extended Feature Enable Register (EFER) having number 0×C0000080.

25. The processor of claim 20, wherein the bit position of the code segment register is a CS.L bit position.

26. The processor of claim 25, wherein the bit position of the model specific register is an EFER.LMA bit position.

27. The processor of claim 20, wherein, if the first bit value, the second bit value, and the third bit value are set to binary one, the canonicality check on the virtual address will fail due to the bits stored in the bit positions 62:57 of the virtual address being non-canonical when the virtual address is used for a code fetch.

28. The processor of claim 20, wherein, if the first bit value, the second bit value, and the third bit value are set to binary one, the canonicality check on the virtual address will fail due to the bits stored in the bit positions 62:57 of the virtual address being non-canonical when the virtual address is used to specify a target of a control transfer instruction.

29. The processor of claim 20, wherein, if the first bit value, the second bit value, and the third bit value are set to binary one, the canonicality check on the virtual address will fail due to the bits stored in the bit positions 62:57 of the virtual address being non-canonical when the virtual address is written to a register selected from a group consisting of GDTR, IDTR, and LDTR.

30. The processor of claim 20, wherein, when the canonicality check will not fail, the bits stored in the bit positions 62:57 of the virtual address comprise one or more metadata bits.

31. The processor of claim 20, wherein, if the first bit value, the second bit value, and the third bit value are set to binary one, and the virtual address is used for the data access, the bits stored in the bit positions 62:57 of the virtual address comprise one or more metadata bits.

32. The processor of claim 31, the one or more metadata bits are to include a first tag that is to be compared with a second tag associated with data being accessed by the virtual address as part of a lock and key security access control in which the first and second tags should match.

33. The processor of claim 20, further comprising a control register having a bit position to store the third bit value.

34. The processor of claim 20, wherein the virtual address further has a most significant bit field in bit positions 63:57.

35. The processor of claim 34, wherein the virtual address has, at bit position 63, a bit to indicate whether the virtual address corresponds to user level or supervisor level.

36. A processor comprising:
an Extended Feature Enable Register (EFER) having number 0×C0000080 having an EFER.LMA bit position to store a first bit value;
a code segment (CS) register having a CS.L bit position to store a second bit value; and
circuitry to perform a canonicality check on a virtual address having bit positions 56:0 to store an address, wherein, if the first bit value and the second bit value are set to binary one, a third bit value is set to binary one, and the virtual address is used for a data access, the canonicality check on the virtual address will not fail due to bits stored in bit positions 62:57 of the virtual address being non-canonical, and the bits stored in bit positions 62:57 comprise one or more metadata bits.

37. The processor of claim 36, wherein the bits stored in the bit positions 62:57 are to be omitted from the canonicality check, and wherein the circuitry to perform the canonicality check on the virtual address is to check at least bits 56:48 for canonicality when 4-level paging is active.

38. The processor of claim 36, wherein, if the first bit value, the second bit value, and the third bit value are set to binary one, the canonicality check on the virtual address will fail due to the bits stored in the bit positions 62:57 of the virtual address being non-canonical when the virtual address is used for a code fetch, when the virtual address is used to specify a target of a control transfer instruction, or when the virtual address is written to a register selected from a group consisting of GDTR, IDTR, and LDTR.

39. The processor of claim 36, wherein the virtual address further has a most significant bit position 63.

40. The processor of claim 39, wherein the virtual address has, at bit position 63, a bit to indicate whether the virtual address corresponds to user level or supervisor level.

41. A method comprising:
setting a first bit value to binary one in a bit position of a model specific register (MSR);
setting a second bit value to binary one in a bit position of a code segment (CS) register;
setting a third bit value to binary one; and
performing a canonicality check on a virtual address used for a data access and having bit positions 56:0 storing an address, wherein the canonicality check on the virtual address will not fail due to bits stored in bit positions 62:57 of the virtual address being non-canonical.

42. The method of claim 41, further comprising omitting the bits stored in the bit positions 62:57 from the canonicality check.

43. The method of claim 41, further comprising checking at least bits 56:48 for canonicality when 4-level paging is active.

44. The method of claim 41, wherein the MSR is an Extended Feature Enable Register (EFER) having number 0xC0000080, wherein the bit position of the model specific register is an EFER.LMA bit position, and wherein the bit position of the code segment register is a CS.L bit position.

45. The method of claim 44, wherein the virtual address further has a most significant bit position 63.

46. The method of claim 41, wherein the bits stored in the bit positions 62:57 of the virtual address comprise one or more metadata bits.

47. The method of claim 46, wherein the virtual address has, at bit position 63, a bit to indicate whether the virtual address corresponds to user level or supervisor level.

48. A system comprising:
a system memory; and
a processor coupled with the system memory, the processor comprising:
a model specific register (MSR) having a bit position to store a first bit value;
a code segment (CS) register having a bit position to store a second bit value; and
circuitry to perform a canonicality check on a virtual address having bit positions 56:0 to store an address, wherein, if the first bit value and the second bit value are set to binary one, a third bit value is set to binary one, and the virtual address is used for a data access, the canonicality check on the virtual address will not fail due to bits stored in bit positions 62:57 of the virtual address being non-canonical.

49. The system of claim 48, wherein the bits stored in the bit positions 62:57 are to be omitted from the canonicality check.

50. The system of claim 48, wherein the MSR is an Extended Feature Enable Register (EFER) having number 0xC0000080, wherein the bit position of the code segment register is a CS.L bit position, and wherein the bit position of the model specific register is an EFER.LMA bit position.

51. The system of claim 48, wherein, if the first bit value, the second bit value, and the third bit value are set to binary one, the canonicality check on the virtual address will fail due to the bits stored in the bit positions 62:57 of the virtual address being non-canonical when the virtual address is used for a code fetch, when the virtual address is used to specify a target of a control transfer instruction, or when the virtual address is written to a register selected from a group consisting of GDTR, IDTR, and LDTR.

\* \* \* \* \*